US012478518B2

(12) United States Patent
Mun et al.

(10) Patent No.: US 12,478,518 B2
(45) Date of Patent: Nov. 25, 2025

(54) ABSORBENT ARTICLE WITH SIDE SEAM BOND

(71) Applicant: Kimberly-Clark Worldwide, Inc., Neenah, WI (US)

(72) Inventors: Jongmin Mun, Nanjing (CN); Ning Ye, Nanjing (CN); Xixi Miao, Nanjing (CN); Qi Dai, Nanjing (CN); Xiaomin Liu, Shanghai (CN); Weizhi Guo, Tianjin (CN); Jason Sieck, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 342 days.

(21) Appl. No.: 18/263,212

(22) PCT Filed: Feb. 23, 2021

(86) PCT No.: PCT/CN2021/077335
§ 371 (c)(1),
(2) Date: Jul. 27, 2023

(87) PCT Pub. No.: WO2022/178651
PCT Pub. Date: Sep. 1, 2022

(65) Prior Publication Data
US 2024/0082073 A1  Mar. 14, 2024

(51) Int. Cl.
*A61F 13/496* (2006.01)
*A61F 13/15* (2006.01)

(52) U.S. Cl.
CPC ..... *A61F 13/4963* (2013.01); *A61F 2013/15886* (2013.01)

(58) Field of Classification Search
CPC .......... A61F 2013/15886; A61F 13/496; A61F 13/4963
See application file for complete search history.

(56) References Cited

U.S. PATENT DOCUMENTS

| 5,385,775 A | 1/1995 | Wright |
| 5,486,166 A | 1/1996 | Bishop et al. |

(Continued)

FOREIGN PATENT DOCUMENTS

| CN | 101883549 A | 11/2010 |
| CN | 102574389 A | 7/2012 |

(Continued)

OTHER PUBLICATIONS

Metissue, Absorbent Hygiene Products Solutions for improved breathability, softness and fit, Apr. 2018, https://www.metissue.com/articles/absorbent-hygiene-products-solutions-for-improved-breathability--softness-and-fit.

*Primary Examiner* — Susan S Su
(74) *Attorney, Agent, or Firm* — KIMBERLY-CLARK WORLDWIDE, INC.

(57) ABSTRACT

Absorbent articles (30) have bonded materials and bond patterns. One of the absorbent articles (30) has a bond pattern (150a-150d) comprising bonds (151,153,155,155a-155d). The bond pattern (150a-150d) comprises a longitudinally extending series of bonds (151,153), which comprises a first bond (151) and a second bond (153) disposed longitudinally adjacent to the first bond (151). The first bond (151) has an inboard lateral edge (158), an outboard lateral edge (156), a top edge (152), and a bottom edge (154) having a recess portion (164). The second bond (153) has an inboard lateral edge (158) and an outboard lateral edge (156), a top edge (152) having a recess portion (164), and a bottom edge (154). The top edge (152) of the second bond (153) faces the bottom edge (154) of the first bond (151), each of the recess portion (164) of the first bond (151) and the recess portion (164) of the second bond (153) comprises terminal portions (157) which are disposed proximate the same outboard lateral edge (156) or inboard lateral edge (158) of the first bond (151) and the second bond (153). Such (Continued)

bond patterns (150*a*-150*d*) have been found to provide a superior combination of strength and softness.

20 Claims, 5 Drawing Sheets

(56) References Cited

U.S. PATENT DOCUMENTS

| | | | |
|---|---|---|---|
| 5,490,846 | A | 2/1996 | Ellis et al. |
| 5,599,338 | A | 2/1997 | Enloe |
| 5,626,574 | A | 5/1997 | Sasaki et al. |
| 5,820,973 | A | 10/1998 | Dodge, II et al. |
| D412,508 | S | 8/1999 | Witsken |
| D422,698 | S | 4/2000 | Witsken |
| 6,057,024 | A | 5/2000 | Mleziva et al. |
| D444,876 | S | 7/2001 | Oberstadt |
| D444,877 | S | 7/2001 | Oberstadt |
| D445,897 | S | 7/2001 | Oberstadt |
| D445,898 | S | 7/2001 | Malchow et al. |
| D446,302 | S | 8/2001 | Blenke et al. |
| D448,847 | S | 10/2001 | Blenke et al. |
| 6,713,159 | B1 | 3/2004 | Blenke et al. |
| 6,969,441 | B2 | 11/2005 | Welch et al. |
| 7,803,244 | B2 | 9/2010 | Siqueira et al. |
| 8,197,458 | B2 | 6/2012 | Bäck |
| 8,361,913 | B2 | 1/2013 | Siqueira et al. |
| D888,943 | S | 6/2020 | Naylor et al. |
| 2002/0048652 | A1 | 4/2002 | Malchow et al. |
| 2012/0035564 | A1 | 2/2012 | Otsubo et al. |
| 2012/0253307 | A1 | 10/2012 | Takeuchi et al. |
| 2012/0284904 | A1 | 11/2012 | Otsubo et al. |
| 2016/0120709 | A1 | 5/2016 | Hamamoto et al. |
| 2016/0199233 | A1 | 7/2016 | Schoultz et al. |
| 2016/0250082 | A1 | 9/2016 | Hamamoto et al. |
| 2019/0290504 | A1 | 9/2019 | Dria et al. |

FOREIGN PATENT DOCUMENTS

| | | | | |
|---|---|---|---|---|
| CN | 102753331 | A | * 10/2012 | ............. B29C 66/21 |
| CN | 205019271 | U | 2/2016 | |
| CN | 206642003 | U | 11/2017 | |
| CN | 107920937 | A | 4/2018 | |
| CN | 118021532 | A | * 5/2024 | ........... A61F 13/565 |
| CN | 118977422 | A | * 11/2024 | ......... A61F 13/4963 |
| EP | 0657153 | B1 | 2/1998 | |
| EP | 3730110 | A1 | 10/2020 | |
| JP | 2003024382 | A | * 1/2003 | ......... A61F 13/4963 |
| JP | 2008099865 | A | 5/2008 | |
| JP | 4671876 | B2 | 4/2011 | |
| JP | 2015008950 | A | 1/2015 | |
| JP | 5828505 | B2 | 12/2015 | |
| WO | 2014103818 | A1 | 7/2014 | |
| WO | 2014208635 | A1 | 12/2014 | |
| WO | 2014208637 | A1 | 12/2014 | |
| WO | 2014208639 | A1 | 12/2014 | |
| WO | 2014208640 | A1 | 12/2014 | |
| WO | 2014208651 | A1 | 12/2014 | |
| WO | 2014208652 | A1 | 12/2014 | |
| WO | 2015064418 | A1 | 5/2015 | |
| WO | 2015064606 | A1 | 5/2015 | |
| WO | 2016098522 | A1 | 6/2016 | |
| WO | 2020004081 | A1 | 1/2020 | |

* cited by examiner

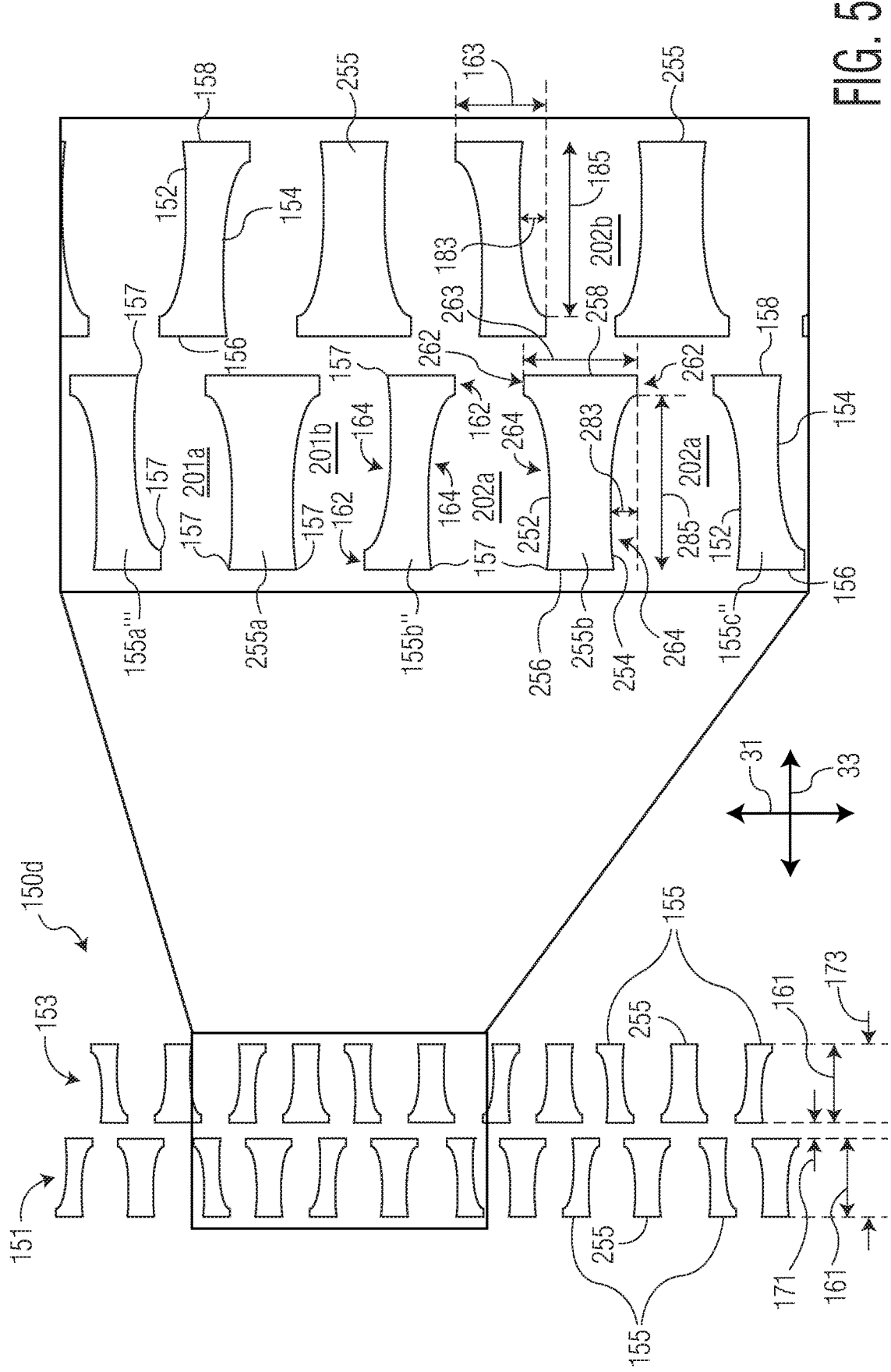

ABSORBENT ARTICLE WITH SIDE SEAM BOND

TECHNICAL FIELD

The present disclosure is directed toward bonded materials, and more particularly to bonding patterns for bonding components of wearable articles.

BACKGROUND OF THE DISCLOSURE

Wearable articles have been in use for a long time. Personal care hygiene products, including absorbent articles find use, for example, as diapers, training pants, incontinence products, women's sanitary pads, and the like. Such absorbent articles are designed and constructed to absorb and store liquid bodily excretions such as urine, menstrual fluid, or blood. Women's sanitary pads are used, for example, to absorb the liquids excreted prior to, during, and after menstruation.

In wearable articles, including absorbent articles, the portions of the article where different layers or components are bonded together tend to incur significant stress concentrations. Many conventional patterns used in wearable articles utilize uniform and crossing straight lines or straight rows of circular bond elements in such bonded areas. These typical bond patterns can cause the bonded areas to fracture under such stresses and may impart a feeling of hardness to the article.

The present disclosure is directed toward bonds which bond together materials or components and which provide for sufficient bond strength. Additional advantages of the embodiments in accordance with the present disclosure as further described below.

SUMMARY OF THE DISCLOSURE

In a first embodiment, an absorbent article may comprise a first material layer bonded to a second material layer by a plurality of bonds, the plurality of bonds comprising a bond pattern extending in a longitudinal direction and a lateral direction and which comprises: a first longitudinally extending series of a plurality of bonds comprising: a first bond having an inboard lateral edge, an outboard lateral edge, a top edge, and a bottom edge, the bottom edge of the first bond having a recess portion; a second bond disposed longitudinally adjacent to the first bond and having an inboard lateral edge, an outboard lateral edge, a top edge, and a bottom edge, the top edge of the second bond having a recess portion, and wherein the top edge of the second bond faces the bottom edge of first bond; wherein each of the recess portion of the first bond and the recess portion of the second bond comprise a terminal portion which are disposed proximate a same outboard lateral edge or inboard lateral edge of the first bond and the second bond.

In a second embodiment, an absorbent article may comprise a first material layer bonded to a second material layer by a plurality of bonds, the plurality of bonds comprising a bond pattern extending in a longitudinal direction and a lateral direction and which comprises: a first longitudinally extending series of a plurality of bonds comprising: a first bond having an inboard lateral edge, an outboard lateral edge, a top edge, and a bottom edge, the bottom edge of the first bond having a recess portion and the top edge of the first bond having a recess portion; a second bond disposed longitudinally adjacent to the first bond and having an inboard lateral edge, an outboard lateral edge, a top edge, and a bottom edge, the top edge of the second bond having a recess portion and the bottom edge of the second bond having a recess portion, and wherein the top edge of the second bond faces the bottom edge of first bond; wherein each of the recess portion of the bottom edge of the first bond and the recess portion of the top edge of the second bond comprise a terminal portion which are disposed proximate a same outboard lateral edge or inboard lateral edge of the first bond and the second bond.

In a third embodiment, a method of manufacturing an absorbent article may comprise: moving a first web in a first direction; moving an absorbent structure in the first direction and coupling the absorbent structure to the first web; forming a plurality of bonds in the first web, the plurality of bonds forming a bond pattern extending in a longitudinal direction and a lateral direction and comprising: a first longitudinally extending series of a plurality of bonds comprising: a first bond having an inboard lateral edge, an outboard lateral edge, a top edge, and a bottom edge, the bottom edge of the first bond having a recess portion; a second bond disposed longitudinally adjacent to the first bond and having an inboard lateral edge, an outboard lateral edge, a top edge, and a bottom edge, the top edge of the second bond having a recess portion, and wherein the top edge of the second bond faces the bottom edge of first bond; wherein each of the recess portion of the first bond and the recess portion of the second bond comprise a terminal portion which are disposed proximate a same outboard lateral edge or inboard lateral edge of the first bond and the second bond.

BRIEF DESCRIPTION OF DRAWINGS

Repeat use of reference characters in the present specification and drawings is intended to represent the same or analogous features or elements of the disclosure.

FIG. 5 illustrates a schematic depiction of a still further exemplary side seam bond pattern, according to aspects of the present disclosure.

DETAILED DESCRIPTION OF THE DISCLOSURE

Figure 1:
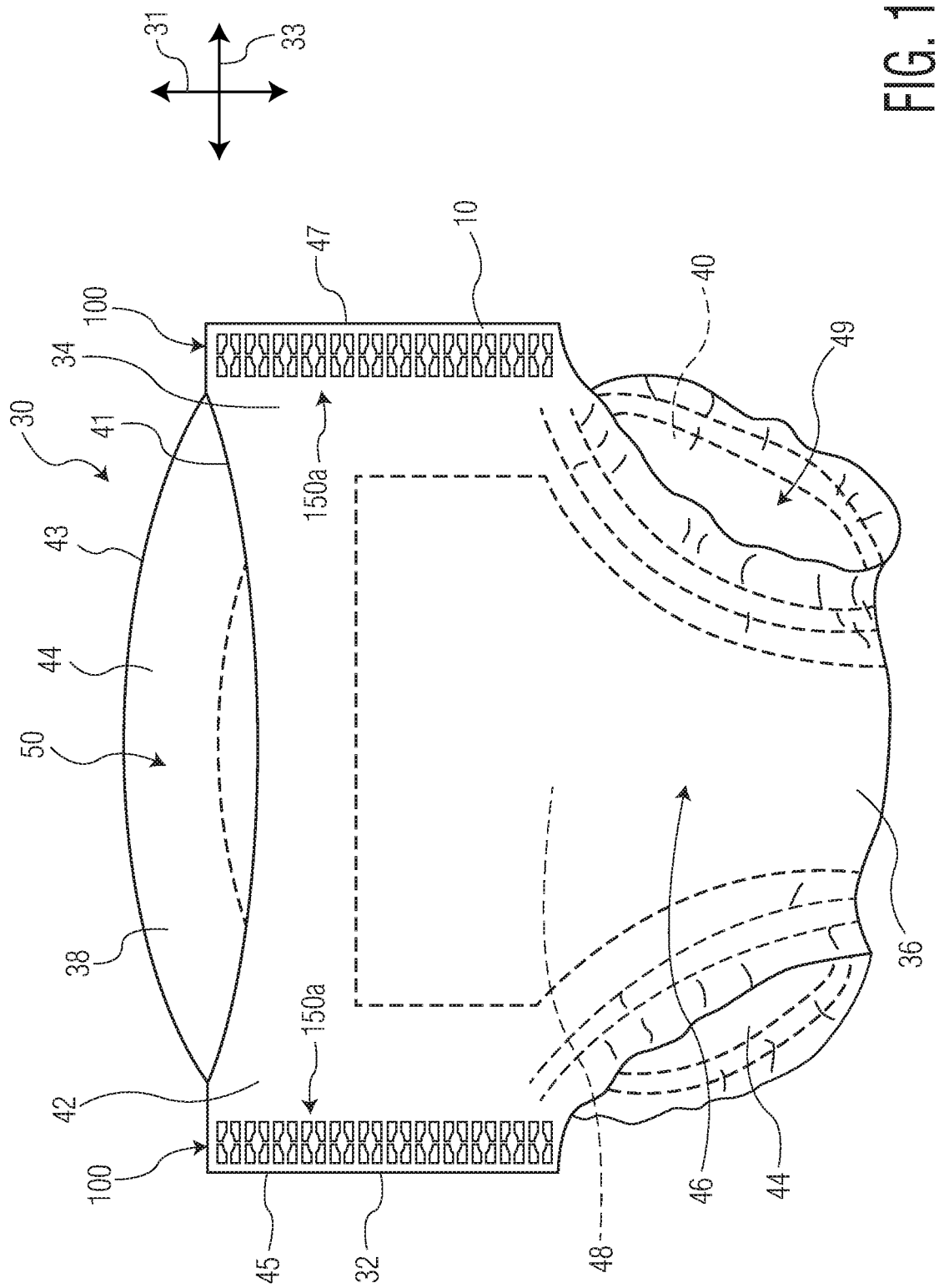
FIG. 1 illustrates a front perspective view of an exemplary absorbent article including side seams, according to aspects of the present disclosure.

With reference to the drawings, FIG. 1 illustrates one suitable aspect of an absorbent article of the present disclosure in the form of a diaper pant, indicated generally at 30. While the present disclosure is described in the context of the diaper pant 30, it should be understood that aspects of the present disclosure are applicable to other articles, such as, for example, refastenable diapers, adult incontinence garments, children's training pants, swim diapers, feminine care articles, and the like.

In one suitable aspect, the diaper pant 30 is a disposable absorbent article. As used herein, the term "disposable absorbent article" refers to articles that absorb and contain body exudates and that are intended to be discarded after a limited period of use. The articles are not intended to be laundered or otherwise restored for reuse. The articles can be placed against or in proximity to the body of a wearer to absorb and contain various exudates discharged from the body. It is understood that in other suitable aspects, the diaper pant 30 (or more broadly, the absorbent article) can be reusable. That is, the absorbent article can be intended for multiple uses without departing from some aspects of this disclosure.

FIG. 1 illustrates the diaper pant 30 in an assembled, closed condition. The diaper pant 30 has a longitudinal direction 31 and a lateral direction 33. In the longitudinal direction 31, the diaper pant 30 defines a front region 34, a back region 38, and a crotch region 36 extending between and connecting the front region 34 and the back region 38.

The diaper pant 30 has a front waist edge 41 in the front region 34, a back waist edge 43 in the rear region 38, and transversely opposed first and second front side edges 45, 47. In the illustrated aspect, the front waist edge 41 and the back waist edge 43 are straight edges. It is understood, however, that the front waist edge 41 and/or the back waist edge 43 can be cut in any suitable shape as is known in the art (e.g., arcuate).

The diaper pant 30 includes an absorbent structure 48 disposed at least in the crotch region 36. According to some aspects of the present disclosure, the absorbent structure 48 may be disposed between the outer cover 42 and the body side liner 44, which is disposed in a superposed relation and connected together by suitable means such as adhesives, ultrasonic bonds, thermal bonds, pressure bonds, or any combinations.

As depicted in FIG. 1, the diaper pant 30 may be formed of a one-piece construction where the outer cover 42 extends all the way from the front waist edge 41 to the rear waist edge 43. In some of these embodiments, the outer cover 42 may comprise a liquid impermeable material, for example a film material, which prevents liquids and other material from escaping the pant 30. In further of these embodiments, the absorbent structure 48 may be part of a central absorbent assembly, indicated generally at 46, that extends longitudinally from the front region 34 to the back region 38. In such embodiments, the absorbent assembly 46 may comprise a liquid impermeable layer (not shown) and a body facing liner, such as liner 44. This absorbent assembly 46 may then be applied to the outer cover 42, which may be a soft, liquid permeable nonwoven material in these embodiments, with the liquid impermeable layer of the absorbent assembly 46 disposed adjacent the outer cover 42. The front region 34 and the rear region 38 may generally comprise one or more nonwoven layers and one or more elastic elements (for example a plurality of elastic strands or ribbons, or a unitary elastic film; not shown) to form an elastic belt structure in the front region 34 and the rear region 38.

Alternatively, it should be understood that diaper pants 30 contemplated by the present disclosure further include articles formed of a three-piece construction. Such three-piece diaper pants may have an elastic front waist panel including one or more nonwoven layers and one or more elastic elements (e.g. forming front region 36) and an elastic rear waist panel including one or more nonwoven layers and one or more elastic elements (e.g. forming the rear region 38). These elastic front and rear waist panels are discrete components separated by a gap. In such embodiments, the absorbent assembly 46, comprising a liquid impermeable outer cover 42 and the bodyside liner 44, spans between and connects such a front waist elastic panel and rear waist elastic panel. Many variations of such one-piece and three-piece constructions, in terms of included materials and material layers, are known in the art and contemplated by the present disclosure.

As seen in FIG. 1, front region 36 of the pant 30 is joined to the rear region 38 via seams 100. The seams 100 fasten the pant 30 to define a pull-on, pant-like configuration of the diaper pant 30 having a waist opening, indicated at 50, and two leg openings, indicated at 49. More specifically, each portion of the pant 30 in the front region 34 and the rear region 38 proximate the side edges 45, 47 are joined together to form the seams 100.

With the diaper pant 30 in the pull-on, pant-like configuration, illustrated in FIG. 1, the front region 36 includes the portion of the diaper pant 30 that, when worn, is positioned at least in part on the front of the wearer while the back region 38 includes the portion of the diaper pant 30 that is positioned at least in part on the back of the wearer. The crotch region 36 of the diaper pant 30 includes the portion of the diaper pant 30 that is positioned between the legs of the wearer and covers the lower torso of the wearer. The side edges 45, 47 may generally be disposed at the hips of the wearer when the pant 30 is worn.

Where the outer cover 42 includes a material which is substantially liquid impermeable, the outer cover 42 can be a single layer of liquid impermeable material but more suitably includes a multi-layered laminate structure in which at least one of the layers is liquid impermeable. For instance, the outer cover 42 can include a liquid permeable outer layer and a liquid impermeable inner layer that are suitably joined together by an adhesive, ultrasonic bonding, thermal bonding, pressure bonding, or combinations thereof. Suitable adhesives can be applied continuously or intermittently as beads, a spray, parallel swirls, or the like. The liquid permeable outer layer can be any suitable material, including materials that provide a generally cloth-like texture. The outer layer can also be made of those materials of which the liquid permeable bodyside liner 44 is made. While it is not a necessity for the outer layer to be liquid permeable, it is suitable that it provides a relatively cloth-like texture to the wearer.

Where the outer cover 42 comprises a liquid impermeable layer, the inner layer of the outer cover 42 can be both liquid and vapor impermeable, or it can be liquid impermeable and vapor permeable. The inner layer can be manufactured from a thin plastic film, although other flexible liquid impermeable materials can also be used. The inner layer, or the liquid impermeable outer cover 42 when a single layer, prevents waste material from wetting articles, such as bed sheets and clothing, as well as the wearer and caregiver.

If the outer cover 42 is a single layer of material, it can be embossed and/or matte finished to provide a more cloth-like appearance. As earlier mentioned, the liquid impermeable material can permit vapors to escape from the interior of the disposable absorbent article, while still preventing liquids from passing through the outer cover 42. One suitable "breathable" material is composed of a microporous polymer film or a nonwoven fabric that has been coated or otherwise treated to impart a desired level of liquid impermeability.

It is also contemplated that the outer cover 42 can be stretchable, and more suitably elastic. In particular, the outer cover 42 is suitably stretchable and more suitably elastic in at least the transverse, or circumferential direction of the pant 30. In other aspects the outer cover 42 can be stretchable, and more suitably elastic, in both the transverse and the longitudinal direction.

The liquid permeable bodyside liner 44 can, but does need not to, have the same dimensions as the outer cover 42. The bodyside liner 44 is suitably compliant, soft feeling, and non-irritating to the wearer's skin. The bodyside liner 44 is also sufficiently liquid permeable to permit liquid body exudates to readily penetrate through its thickness to the absorbent structure 48. Further, the bodyside liner 44 can be less hydrophilic than the absorbent structure 48 to present a relatively dry surface to the wearer and permit liquid to readily penetrate through its thickness. The hydrophilic/hydrophobic properties can be varied across the length, width and/or depth of the bodyside liner 44 and absorbent structure 48 to achieve the desired wetness sensation or leakage performance.

The bodyside liner 44 can be manufactured from a wide selection of web materials, such as porous foams, reticulated foams, apertured plastic films, woven and nonwoven webs, or a combination of any such materials. For example, the bodyside liner 44 can include a meltblown web, a spunbonded web, or a bonded-carded-web composed of natural fibers, synthetic fibers or combinations thereof. The bodyside liner 44 can be composed of a substantially hydrophobic material, and the hydrophobic material can optionally be treated with a surfactant or otherwise processed to impart a desired level of wettability and hydrophilicity. The surfactant can be applied by any conventional means, such as spraying, printing, brush coating or the like. The surfactant can be applied to the entire bodyside liner 44 or can be selectively applied to particular sections of the bodyside liner 44, such as the medial section along the longitudinal center line.

The bodyside liner 44 can also be stretchable, and, more suitably, it can be elastomeric. In particular, the bodyside liner 44 is suitably stretchable and more suitably elastomeric in at least the lateral or lateral direction 33 of the pant 30. In other aspects the bodyside liner 44 can be stretchable, and more suitably elastomeric, in both the lateral direction 33 and the longitudinal direction 31.

The absorbent structure 48 is suitably compressible, conformable, non-irritating to a wearer's skin, and capable of absorbing and retaining liquids and certain body wastes. For example, the absorbent structure 48 can include cellulosic fibers (e.g., wood pulp fibers), other natural fibers, synthetic fibers, woven or nonwoven sheets, scrim netting or other stabilizing structures, superabsorbent material, binder materials, surfactants, selected hydrophobic materials, pigments, lotions, odor control agents or the like, as well as combinations thereof. In further embodiments, the absorbent structure 48 can be cellulose free and comprise only superabsorbent material as the absorbent material of the absorbent structure 48.

The materials can be formed into a web structure by employing various conventional methods and techniques. For example, the absorbent structure 48 can be formed by a dry-forming technique, an air forming technique, a wet-forming technique, a foam-forming technique, or the like, as well as combinations thereof. Furthermore, the absorbent structure 48 can itself encompass multiple layers in a Z-direction (e.g., thickness) of the absorbent structure 48. Such multiple layers can take advantage of differences in absorbent capacity, such as by placing a lower absorbent capacity material layer closer to the bodyside liner 44 and a higher absorbent capacity material closer to the outer cover 42. Likewise, discrete portions of a single-layered absorbent structure can encompass higher capacity absorbents, and other discrete portions of the structure can encompass lower capacity absorbents.

Superabsorbent material is suitably present in the absorbent structure 48 in an amount of from about 0 to about 100 weight percent based on total weight of the absorbent structure 48. The absorbent structure 48 can suitably have a density within the range of about 0.10 to about 0.60 grams per cubic centimeter. Superabsorbent materials are well known in the art and can be selected from natural, synthetic, and modified natural polymers and materials. The superabsorbent materials can be inorganic materials, such as silica gels, or organic compounds, such as crosslinked polymers. Typically, a superabsorbent material is capable of absorbing at least about 10 times its weight in liquid, and preferably is capable of absorbing more than about 25 times its weight in liquid.

The absorbent structure 48 can alternatively include a coform material. The term "coform material" generally refers to composite materials including a mixture or stabilized matrix of thermoplastic fibers and a second non-thermoplastic material. As an example, coform materials are made by a process in which at least one meltblown die head is arranged near a chute through which other materials are added to the web while it is forming. Such other materials can include, but are not limited to, fibrous organic materials such as woody or non-woody pulp such as cotton, rayon, recycled paper, pulp fluff and also superabsorbent particles, inorganic absorbent materials, treated polymeric staple fibers and the like. Any of a variety of synthetic polymers can be utilized as the melt-spun component of the coform material. For instance, in certain aspects, thermoplastic polymers can be utilized. Some examples of suitable thermoplastics that can be utilized include polyolefins, such as polyethylene, polypropylene, polybutylene and the like; polyamides; and polyesters. In one aspect, the thermoplastic polymer is polypropylene.

In one suitable aspect, the absorbent structure 48 is stretchable so as not to inhibit the stretchability of other components to which the absorbent structure can be adhered, such as the outer cover 42 and the bodyside liner 44. After being formed or cut to a desired shape, the absorbent structure 48 can be wrapped or encompassed by a suitable wrap (not shown) that aids in maintaining the integrity and shape of the absorbent structure 48.

The absorbent assembly 46 can also include a surge management layer (not shown) located adjacent the absorbent structure 48 (e.g., between the absorbent structure 48 and the bodyside liner 44) to help decelerate and diffuse surges or gushes of liquid that can be rapidly introduced into the absorbent structure 48 of the diaper pant 30 by the wearer. Desirably, the surge management layer can rapidly accept and temporarily hold the liquid prior to releasing the liquid into the storage or retention portions of the absorbent structure 48. Examples of suitable surge management layers are described in U.S. Pat. No. 5,486,166 issued Jan. 23, 1996 to Bishop et al.; U.S. Pat. No. 5,490,846 issued Feb. 13, 1996 to Ellis et al.; and U.S. Pat. No. 5,820,973 issued Oct. 13, 1998 to Dodge, II et al., the entire disclosures of which are hereby incorporated by reference.

The absorbent assembly 46 can also include a pair of containment flaps (not shown) that extend longitudinally along the absorbent assembly 46 and are adapted to provide a barrier to the lateral flow of body exudates as is known in the art. The containment flaps can be connected to the bodyside liner 44 or other components of the absorbent assembly 46. Suitable configurations of the containment flaps are described, for example, in U.S. Pat. No. 5,599,338 issued Feb. 4, 1997, to K. Enloe, the entirety of which is incorporated herein by reference.

According to some embodiments of the present disclosure, the front region 34 and the rear region 38 may form a chassis used to carry an absorbent assembly 46 and/or to provide elastomeric properties to the pant 30 to enhance a fit of the pant 30 on a wearer. In such embodiments, the front region 34 and the rear region 38 may have a multi-layer laminate construction including an inner or body-facing layer, an outer or garment-facing layer, and an elastic layer disposed between the body-facing layer and the garment-facing layer, as is generally known in the art. In embodiments where the diaper pant 30 is a one-piece construction article, the garment-facing layer may comprise the outer cover 42 and extend from the front waist edge 41 to the rear waist edge 43.

The body-facing layer and the garment-facing layer may be joined together in face-to-face relationship by suitable means such as adhesives, ultrasonic bonding, thermal bonding, pressure bonding, or combinations thereof. Suitable adhesives, which can be applied continuously or intermittently as beads, a spray, parallel swirls, or the like, include elastomeric adhesives, such as aqueous-based styrene butadiene adhesives, neoprene, polyvinyl chloride, vinyl copolymers, polyamides, and ethylene vinyl terpolymers.

The body-facing layer may be constructed from a non-apertured nonwoven material. Suitable nonwovens include single layer nonwovens, such as spunbond webs, and nonwoven laminates. In one suitable aspect, the body-facing layer includes a spunbond/spunbond/spunbond ("SSS") laminate. In another suitable aspect, the body-facing layer includes at least one meltblown layer positioned between two or more spunbond layers to form a spunbond/meltblown/spunbond ("SMS") laminate. In one particular aspect, the body-facing layer includes a spunbond/spunbond/meltblown/meltblown/spunbond laminate ("SSMMS"). The nonwoven laminate can have other configurations and possess any desired number of meltblown and spunbond layers, such as spunbond/meltblown/meltblown/spunbond laminates ("SMMS"), spunbond/meltblown laminates ("SM"), etc. In addition to or as an alternative to meltblown and spunbond webs, a variety of other nonwoven webs can also be used to form the body-facing layer including, for example and without limitation, through-air bonded carded webs, thermally bonded carded webs, wet-laid webs, coform webs, and hydraulically entangled webs.

The body-facing layer may be liquid-impermeable and vapor permeable. That is, the body-facing layer permits vapors to escape from the interior of the disposable absorbent article, while still preventing liquids from passing through the body-facing layer. The body-facing layer can be treated or otherwise processed to impart a desired level of liquid impermeability to the body-facing layer. Although, in other embodiments where liquid is contained to the absorbent assembly 46, for example where containment flaps are provided, the body-facing layer may be both liquid-permeable and vapor permeable.

The elastic layer is attached to at least one of the body-facing layer and the garment-facing layer to impart a desired level of elasticity to the laminate. The elastic layer can be attached to the body-facing layer and/or the garment-facing layer by any suitable means including, for example, adhesives. The elastic layer can be stretched and then adhered, or adhered to one or both of the body-facing layer and the garment-facing layer when the layers are in a gathered state to impart a desired level of elasticity to the laminate. In other aspects, the elastic layer is adhered to one or both of the body-facing layer and the garment-facing layer, and then elasticized or shrunk, for example with the application of heat, such that elastic retractive forces are imparted to the laminate.

The elastic layer can be formed of a variety of suitable elastic materials, including sheets, strands, or ribbons of natural rubber, synthetic rubber, or thermoplastic elastomeric polymers. In the illustrated aspect, the elastic layer includes a plurality of elastomeric strands extending in the lateral direction 33 of the diaper pant 30. In one suitable aspect, the elastomeric strands include dry-spun coalesced multifilament spandex elastomeric strands sold under the trade name LYCRA® and available from Invista of Wichita, Kansas, U.S.A. Other suitable materials from which the elastic layer can be constructed include vertical filament laminate (VFL) materials, an example of which is described in U.S. Pat. No. 6,916,750 to Thomas et al., which is hereby incorporated by reference; apertured elastic films, examples of which are described in U.S. Pat. No. 7,803,244 issued Sep. 28, 2010 to Siqueira et al., and U.S. Pat. No. 8,361,913 issued Jan. 29, 2013 to Siqueira et al., both of which are hereby incorporated by reference, and other elastic laminates such as single- and dual-faced spandex laminates, stretch-bonded laminates (SBL), and continuous filament stretch-bonded laminates (CFSBL), examples of which are described in U.S. Pat. No. 5,385,775 issued Jan. 31, 1995 to Wright; U.S. Pat. No. 6,057,024 issued May 2, 2000 to Mleziva et al.; and U.S. Pat. No. 6,969,441 issued Nov. 29, 2005 to Welch et al., all of which are hereby incorporated by reference.

The garment-facing layer is vapor permeable, and can be liquid permeable or liquid impermeable. The garment-facing layer can be constructed from an apertured nonwoven, such as a single layer nonwoven or a nonwoven laminate. In one suitable aspect, the garment-facing layer includes a spunbond/spunbond/spunbond ("SSS") laminate. In another suitable aspect, the garment-facing layer includes at least one meltblown layer positioned between two or more spunbond layers to form a spunbond/meltblown/spunbond ("SMS") laminate. In one particular aspect, the garment-facing layer includes a spunbond/spunbond/meltblown/meltblown/spunbond laminate ("SSMMS"). The nonwoven laminate can have other configurations and possess any desired number of meltblown and spunbond layers, such as spunbond/meltblown/meltblown/spunbond laminates ("SMMS"), spunbond/meltblown laminates ("SM"), etc. In addition to or as an alternative to meltblown and spunbond webs, a variety of other nonwoven webs can also be used to form the body-facing layer including, for example and without limitation, through-air bonded carded webs, thermally bonded carded webs, wet-laid webs, coform webs, and hydraulically entangled webs.

According to aspects of the present disclosure, particular bonding patterns—for example bonding patterns 150a, 150b, 150c, and 150d of FIGS. 2-5—have been identified as advantageous for use as forming the seams 100 proximate the side edges 45, 47 of the described diaper pants 30. Such bonding patterns 150a-d as described herein have been found to provide a superior combination of strength and softness. Typical side seam bonding patterns may provide sufficient strength to ensure the pant 30 does not tear open during donning or while in use. However, such typical side seam bonding patterns—for example patterns comprising uniform and crossing straight lines or straight rows of circular bond elements—can be perceived as providing a hard, rough edge to articles which include such bonding patterns as well as requiring greater surface area to achieve a desired bonding strength.

Figure 2:
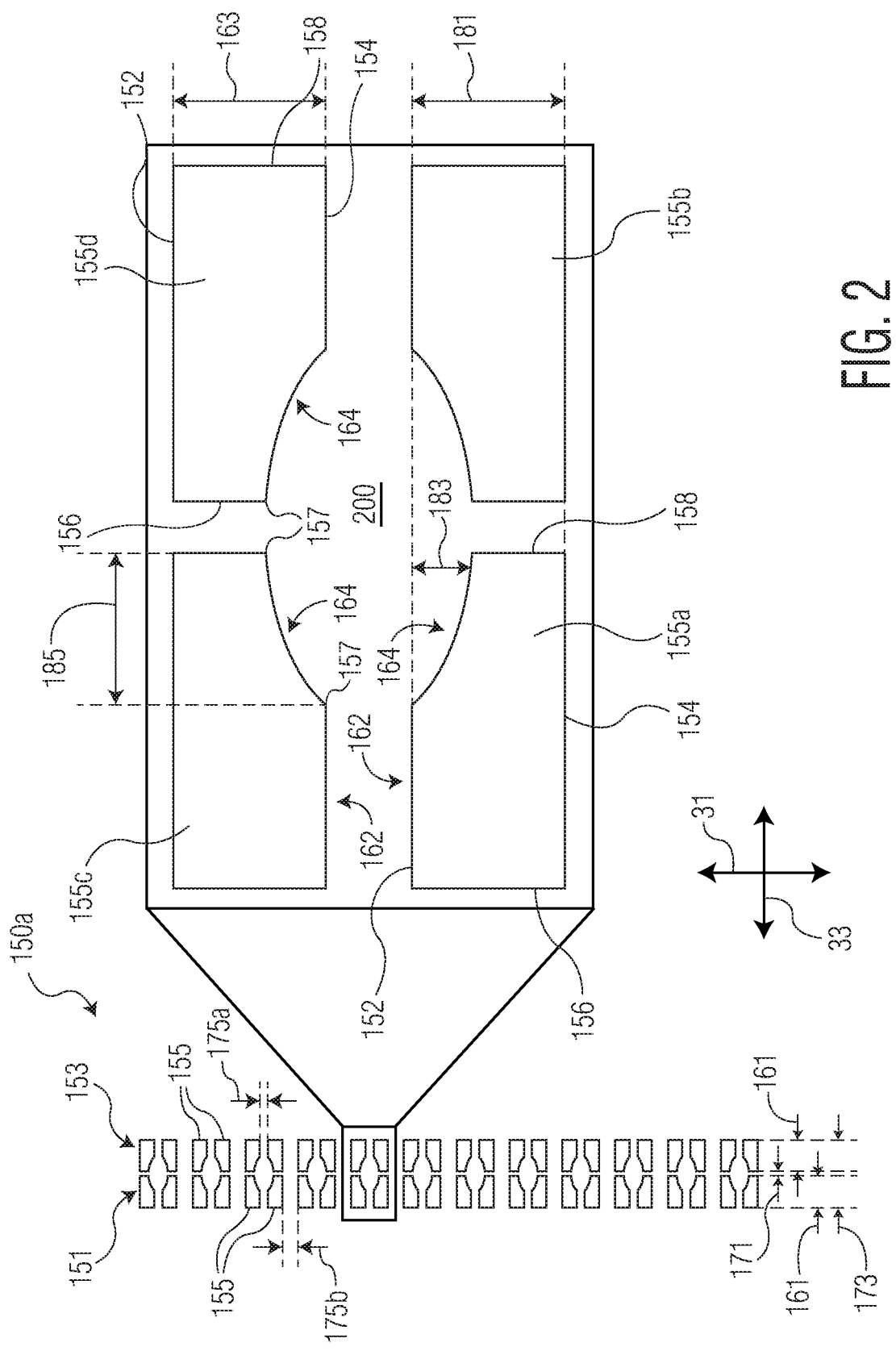
FIG. 2 illustrates a schematic depiction of an exemplary side seam bond pattern, according to aspects of the present disclosure.

FIG. 2 depicts a portion of a bonding pattern 150a according to aspects of the present disclosure. For purposes of description, the illustrated bonding pattern 150a of FIG. 2 may be the bonding pattern 150a of the FIG. 1 disposed proximate the side edge 45. As will be understood, in describing the bonding pattern of FIG. 2 and the bonding patterns of the further figures, the use of terms such as inboard, outboard are relative to the side edge 45, 47 proximate where the bonding pattern 150a is located. For example, in the illustration of FIG. 2, the pattern 150a may comprise two longitudinally extending series of bonds 151, 153. The first longitudinally extending series of bonds 151 of FIG. 2 may comprise the longitudinally extending series of bonds most proximate the side edge 45 and therefore represent the most outboard longitudinally extending series of bonds of the pattern 150a. Conversely, the longitudinally extending series of bonds 153 may comprise the longitudinally extending series of bonds most distal the side edge 45 and therefore represent the most inboard longitudinally extending series of bonds of the pattern 150a. As can be seen in FIG. 2, the longitudinally extending series of bonds 151 is disposed to the left of the longitudinally extending series of bonds 153. With respect to the bond pattern 150a disposed proximate the side edge 47 in FIG. 1, the longitudinally extending series of bonds 151 may be disposed on the right of the longitudinally extending series of bonds 153, such that the longitudinally extending series of bonds 151 is the most outboard of the longitudinally extending series of bonds of the bond pattern 150a disposed proximate the side edge 47.

In some embodiments, the first longitudinally extending series of bonds 151 and the second longitudinally extending series of bonds 153 may be laterally separated by a lateral distance 171 that is greater than or equal to 0.4 mm and less than or equal to 1.5 mm. In further embodiments, the first and second longitudinally extending series of bonds 151, 153 may be laterally separated by a lateral distance 171 greater than or equal to 0.4 mm and less than or equal to 1.0 mm, or greater than or equal to 0.5 mm and less than or equal to 0.7 mm. Lateral distances 171 within these ranges have been found to be useful in allowing for an increased total area bounded by the bond pattern 150a, yet reducing the overall bonded area within the total bounded area as compared to lateral distances 171 smaller than the indicated ranges. Having a lower overall bonded area can help to increase the perception of softness. Conversely, lateral distances 171 larger than the indicated ranges can reduce the strength of the bond pattern 150a to below desired levels.

As shown, each of the first and second longitudinally extending series of bonds 151, 153 comprise a plurality of individual bonds 155. Each of the bonds 155 may further comprise a top edge 152, a bottom edge 154, and outer and inner lateral edges 156, 158 (sometimes termed outer or outboard and inner or inboard lateral edges herein), respectively. The top edge 152 may be an edge at least partially facing waist opening 50 while the bottom edge 154 may be an edge at least partially facing the leg openings 49. The outer lateral edge 156 is the lateral edge of the bond 155 disposed most closely to the side edge 45. The inner lateral edge 158 is the lateral edge of the bond 155 disposed furthest away from the side edge 45. Although shown in FIG. 2 as being oriented parallel to the lateral direction 33, the top edge 152 and the bottom edge 154 need not be exactly parallel with the lateral direction 33. Further embodiments contemplated by the present disclosure include those wherein the top edge 152 and/or the bottom edge 154 may be oriented at an angle with respect to the lateral direction 33 of greater than or equal to 0 degrees and less than or equal to 60 degrees, or greater than or equal to 0 degrees and less than or equal to 45 degrees in further embodiments.

Each of the individual bonds 155 comprises an overall width 161 extending in the lateral direction 33 and an overall height 163 extending in the longitudinal direction 31. Exemplary values for the over overall heights 163 of the individual bonds 155 comprise values greater than or equal to 0.5 mm and less than or equal to 2.0 mm, or greater than or equal to 0.75 mm and less than or equal to 1.75 mm, or greater than or equal to 1.0 mm and less than or equal to 1.5 mm. It should be understood that each bond 155 does not need to have the same overall height 163.

Exemplary values for the overall widths 161 of the individual bonds 155 comprise values greater than or equal to 1.0 mm and less than or equal to 3.5 mm, or greater than or equal to 1.5 mm and less than or equal to 3.5 mm, or greater than or equal to 1.5 mm and less than or equal to 3.0 mm. Accordingly, an overall width 173 of the bond pattern 150a, considering the described ranges for the overall widths 161 and the lateral distance 171, may be greater than or equal to 2.4 mm and less than or equal to 8.5 mm, or greater than or equal to 3.0 mm and less than or equal to 8.0 mm, or greater than or equal to 3.5 mm and less than or equal to 7.5 mm, or greater than or equal to 4.0 mm and less than or equal to 7.0 mm, or greater than or equal to 4.5 mm and less than or equal to 7.0 mm. It should be understood that each bond 155 does not need to have the same overall width 161.

The bonds 155 within the first longitudinally extending series of bonds 151 or the second longitudinally extending series of bonds 153 may additionally be spaced from each other in the longitudinal direction a longitudinal distance 175a, 175b. The longitudinal distances 175a, 175b may be greater than or equal to 0.25 mm and less than or equal to 2.0 mm. In further embodiments, the longitudinal distances 175a, 175b may be greater than or equal to 0.50 mm and less than or equal to 1.5 mm, or greater than or equal to 0.75 mm and less than or equal to 1.25 mm. According to some embodiments, it may be desirable that the longitudinal distances 175a, 175b be relative to the overall height 163. In these instances, it may be preferred that the longitudinal distances 175a, 175b are greater than or equal to 25% and less than or equal to 200% of the overall height 163 of one of the bonds 155 adjacent a measured longitudinal distance 175a, 175b. In further embodiments, it may be preferred that the longitudinal distances 175a, 175b are greater than or equal to 50% and less than or equal to 150%, or greater than or equal to 75% and less than or equal to 125% of the overall height 163 of one of the bonds 155 adjacent a measured longitudinal distance 175a, 175b.

As can be seen, the longitudinal distance 175a measures a longitudinal distance between longitudinally adjacent bonds 155 which have recess portions 164 facing each other (as will be described in more detail below) while the distance 175b measures a longitudinal distance between longitudinally adjacent bonds 155 which do not have recess portions 164 facing each other. It should be understood that while both of the distances 175a, 175b may fall within the described ranges, the distances 175a, 175b need not have the same value.

According to some aspects of the present disclosure, at least portions of the individual bonds 155 of the first longitudinally extending series of bonds 151 overlap in the longitudinal direction 31 with laterally adjacent bonds 155 of the second longitudinally extending series of bonds 153. For example, as can be seen in FIG. 2, a longitudinal overlap 181 between laterally adjacent bonds 155 of the first longitudinally extending series of bonds 151 and the second longitudinally extending series of bonds 153 (for example, as depicted with respect to bonds 155a, 155b) may be equal to 100% of the overall height 163 of the laterally outboard bond, e.g. bond 155a. In further embodiments, the longitudinal overlap 181 may be greater than or equal to 25% and less than or equal to 100% of the overall height 163 of the laterally outboard bond, or may be greater than or equal to 50% and less than or equal to 100% of the overall height 163 of the laterally outboard bond, or greater than or equal to 75% and less than or equal to 100% of the overall height 163 of the laterally outboard bond.

Another feature of the bonds 155 as illustrated in FIG. 2 is that at least some of the bonds 155 may comprise a recess portion 164. For example, at least one of the top edge 152 and the bottom edge 154 of at least some of the bonds 155 may comprise a non-recessed portion 162 and a recessed portion 164. Where present, the recess portions 164 may have a lateral width 185 greater than or equal to 25% and less than or equal to 99% of the overall width 161 of the bonds 155. In further embodiments, the recess portions 164 may have a lateral width 185 greater than or equal to 25% and less than or equal to 95%, or greater than or equal to 25% and less than or equal to 80%, or greater than or equal to 25% and less than or equal to 75% of the overall width 161 of the bonds 155. In some particular embodiments, the recess portions 164 may have a lateral width 185 greater than or equal to 25% and less than or equal to 50% of the overall width 161 of the bonds 155.

The recess portions 164 may have a depth 183 that is greater than or equal to 10% and less than or equal to 70% of the overall height of the 163 of the bonds 155. In further embodiments, the depth 183 may be greater than or equal to 10% and less than or equal to 50%, greater than or equal to 10% and less than or equal to 40% of the overall height of the 163 of the bonds 155.

A further feature of the bond pattern 150a is that the recessed portions 164 of two longitudinally adjacent bonds 155 within one of the first longitudinally extending series of bonds 151 and the second longitudinally extending series of bonds 153 may face each other. For example, as can be seen in FIG. 2, the recess portion 164 of bond 155a faces the recess portion 164 of bond 155c, with the recess portion 164 of bond 155c facing the leg opening 49 and the recess portion 164 of bond 155a facing the waist opening 50. Again, although the bonds 155a, 155c are shown as extending generally parallel to the lateral direction 33, including the bottom portion 154 of bond 155c and the top portion 152 of bond 155a, the bonds 155a, 155c may extend at an angle relative to the lateral direction 33 in further embodiments.

In the embodiments of FIG. 2, the recess portions 164 of the bonds 155a, 155c comprise terminal portions 157 which are disposed proximate one of the lateral edge 156, 158 of the bonds 155—in the specific case of the first longitudinally extending series of bonds 151 of FIG. 2, the terminal portions 157 of the longitudinally adjacent bonds 155a, 155c are disposed proximate the inboard lateral edge 158. The recess portion terminal portions 157 may be a point where the recess portion 164 terminates proximate one of the lateral edges 156, 158. Although, the terminal portions 157 may also be the points at which the recess portions 164 meet a non-recessed portion 152. Accordingly, each recess portion 164 will have inboard and outboard terminal portions 157.

According to at least some embodiments of the present disclosure, the recess portions 164 of longitudinally adjacent bonds 155 of the same longitudinally extending series of bonds 151, 153 may have the same lateral widths 185 and/or may have the same depths 183. In further embodiments, the recess portions 164 of longitudinally adjacent bonds 155 of the same longitudinally extending series of bonds 151, 153 may be mirror images of each other, being mirrored about the lateral direction 33.

According to another aspect of the present disclosure, the bonds 155 of the first longitudinally extending series of bonds 151 and the bonds 155 of the second longitudinally extending series of bonds 153 may be disposed such that recess portions 164 of laterally adjacent bonds 155 of the first longitudinally extending series of bonds 151 and the second longitudinally extending series of bonds 153 face each other. For example, as illustrated in FIG. 2, the recess portions 164 of the bond 155c of the first longitudinally extending series of bonds 151 and the recess portion 164 of the bond 155d of the second longitudinally extending series of bonds 153 face each other across the lateral direction 33.

In such embodiments, the bonds 155 may have recess portion terminal edges 157 which are disposed proximate each other across the lateral distance 171, with the bonds 155 of the first longitudinally extending series of bonds 151 having terminal edges 157 disposed proximate the inboard lateral edge 158 and the bonds 155 of the second longitudinally extending series of bonds 153 having terminal edges 157 disposed proximate the outboard lateral edge 156. In at least some of these embodiments, the terminal edges 157 of such bonds, for example bonds 155c, 155d, are disposed at the same longitudinal position.

In at least some of these embodiments, the recess portions 164 of laterally adjacent bonds 155 of the first longitudinally extending series of bonds 151 and the second longitudinally extending series of bonds 153 which face each other may have the same lateral widths 185 and/or may have the same depths 183. In further embodiments, the recess portions 164 of laterally adjacent bonds 155 of the first longitudinally extending series of bonds 151 and the second longitudinally extending series of bonds 153 which face each may be mirror images of each other, being mirrored about the longitudinal direction 33. Of course, it should be understood, as in FIG. 2, that some contemplated embodiments of the present disclosure include where the recess portions 164 of longitudinally adjacent bonds 155 of the same longitudinally extending series of bonds 151, 153 and recess portions 164 of laterally adjacent bonds 155 of the first longitudinally extending series of bonds 151 and the second longitudinally extending series of bonds 153 which face each other have the same lateral widths 185 and/or the same depths 183 and may be mirror images of each other, mirrored about the lateral direction 33 or the longitudinal direction 31.

In this manner, the recess portions 164 of bonds 155 of the bond pattern 150a may define a perimeter of an unbonded region 200. For example, as depicted in FIG. 2, projection lines extending from inboard and outboard edges 158, 156 of the recess portions 164 across the spaces defined between the bonds 155 (e.g. lateral distance 171 between bonds 155a, 155b and 155c, 155d and longitudinal distance 175a between bonds 155a, 155c and 155b, 155d), and along a same path formed by the recess portions 164, would cross to enclose an unbonded region 200 and define a perimeter of a shape. In the example of FIG. 2, where the projection lines extend from and continue along the path formed by the recess portions 164, such a defined perimeter of the unbonded region 200 would have a generally oval shape. Although, in other embodiments, the defined perimeter of the unbonded region 200 could be other common shapes, such as generally circular, generally rectangular, generally diamond-like, or the like, or may define partial portions of such shapes.

According to some embodiments, the recess portions 164 may form greater than or equal to 40% and less than or equal to 95% of a length of the perimeter of the unbonded region enclosed by the recess portions 164 and projection lines extending from the recess portions 164. In further embodiments, recess portions 164 may form greater than or equal to 50% and less than or equal to 95%, or greater than or equal to 60% and less than or equal to 95%, or greater than or equal to 70% and less than or equal to 95% of a length of the perimeter of the unbonded region enclosed by the recess portions 164 and projection lines extending from the recess portions 164.

By having the recess portions 164 form such a high proportion of the length of the defined perimeter of the shape of the unbonded region 200 helps the unbonded material in the region 200 to 'puff' out over the bonds 155 to define a raised shape. Such a raised shape may approximate the shape of the perimeter of the shape of the unbonded region 200. It has been found that where this 'tufting' of the unbonded material occurs, along with the shape of the perimeter of the unbonded region 200, it imparts a greater perception of softness to a wearer when touching the seam 100 than for bond patterns comprising typical rectangle, oval, or circle bonds which do not define such a shape of an unbonded region. It has been found that utilizing such common shapes for the perimeter of the unbonded region 200 such as circular shapes, oval shapes, rectangular shapes, and diamond shapes can result in an increased perception of softness by a wearer relative to other simple geometric shapes and relative to other irregular shapes.

As depicted in FIG. 2, the longitudinally adjacent bonds 155 within one of the first longitudinally extending series of bonds 151 or the second longitudinally extending series of bonds 153 may alternate in the orientation of which of the top edge 152 and the bottom edge 154 comprises the recess portion 164. For example, depicted bond 155*c* comprises a bottom edge 154 which has a recess portion 164. The longitudinally adjacent bond 155*a*, disposed below the bond 155*c* in the longitudinal direction 31, may have a recess portion 164 in the top edge 152 of the bond 155*a*. A bond 155 longitudinally adjacent to the bond 155*a* and disposed below the bond 155*a* in the longitudinal direction 31 may then have a recess portion 164 in the bottom edge 154. Accordingly, neither of the bottom edge 154 of the bond 155*a* and the top edge 152 of the bond 155 longitudinally adjacent to the bond 155*a* and disposed below the bond 155*a* may have a recess portion 164. Although, it should be understood that this is just one exemplary embodiment and such a feature is not required in all embodiments.

Further as seen in FIG. 2, a grouping of two bonds 155 of the first longitudinally extending series of bonds 151 and two bonds of the second longitudinally extending series of bonds 153 may form a unit which defines an outline of an unbonded region 200. Such groupings may form a repeating pattern within the pattern 150*a*. It should be understood that the entire bond pattern 150*a* need not be comprised only of such groupings and that such groupings may only represent a portion of the bond pattern 150*a*. Further, it is not a requirement in all embodiments for the bonds 155 to have only one of the top edge 152 and the bottom edge 154 to have a recess portion 164. In additional embodiments, each top edge 152 and bottom edge 154 of a single bond 155 may have both a non-recessed portion 162 and a recessed portion 164 such that all bonds 155 which are longitudinally adjacent comprise recess portions 164 which face each other in the longitudinal direction 31. Some of these contemplated embodiments are described in more detailed below with respect to FIGS. 4 and 5.

Figure 3:
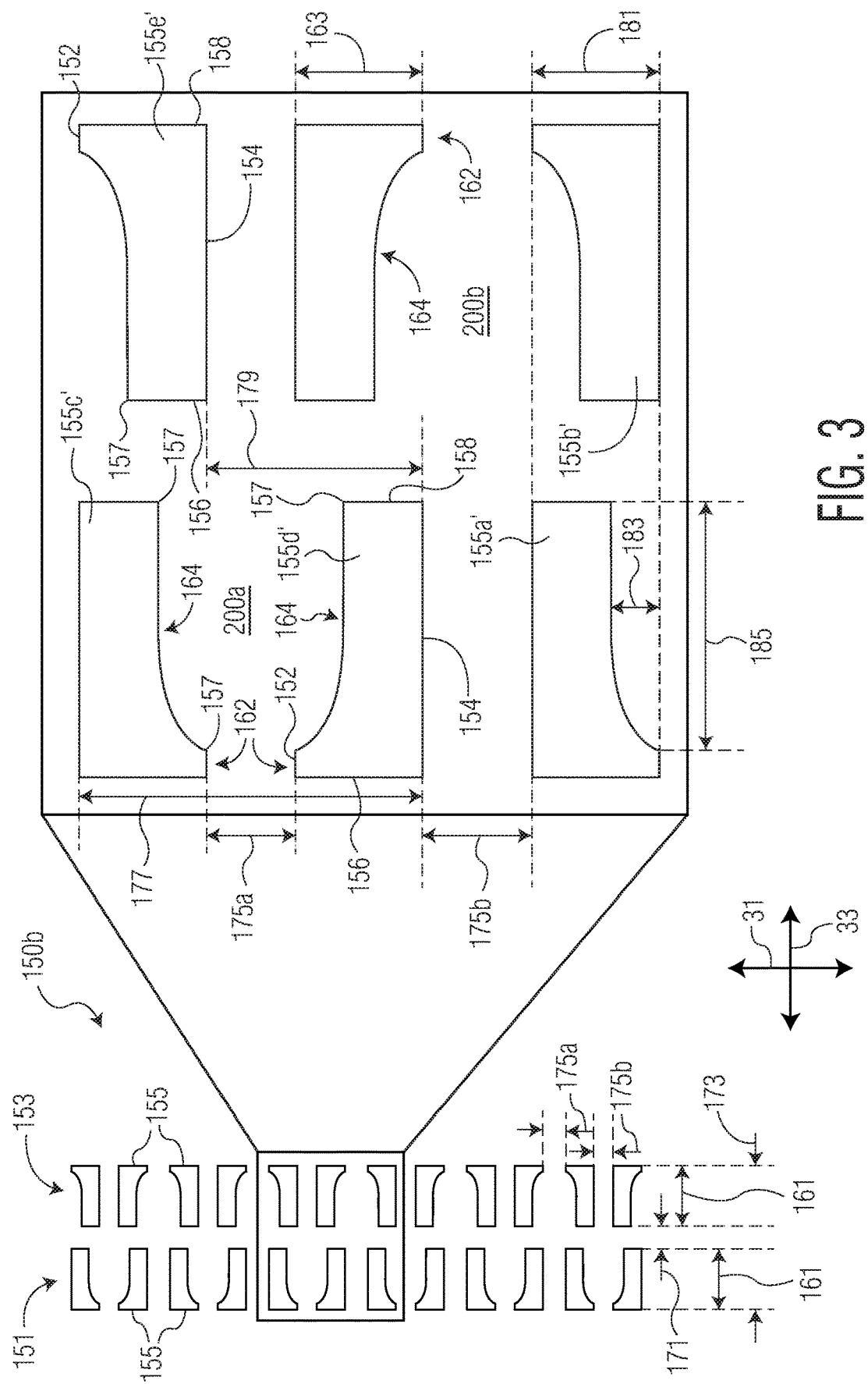
FIG. 3 illustrates a schematic depiction of another exemplary side seam bond pattern, according to aspects of the present disclosure.

FIG. 3 illustrates an alternative bond pattern 150*b*. Bond pattern 150*b* may be similar to bond pattern 150*a* in many ways. For example, the bonds 155 may be arranged in a first longitudinally extending series of bonds 151 and a second longitudinally extending series of bonds 153. The bonds 155 may have top portions 152, bottom portions 154, outboard lateral edges 156, and inboard lateral edges 158. The general dimensions of the bonds 155 of pattern 150*b* may be similar to the dimensions described with respect to the bonds 155 of pattern 150*a*—for example, the overall height 163 and the overall width 161 described with respect to the bonds 155 of pattern 150*a* are applicable to the height 163 and width 161 of the bonds 155 of pattern 150*b*. Additionally, the lateral distance 171 and the longitudinal distances 175*a*, 175*b* of pattern 150*b* may be similar to those described with respect to bond pattern 150*a*.

Additionally, at least portions of the individual bonds 155 of the first longitudinally extending series of bonds 151 overlap in the longitudinal direction 31 with laterally adjacent bonds 155 of the second longitudinally extending series of bonds 153 in the bond pattern 150*b* as in the bond pattern 150*a*. For example, as can be seen in FIG. 3, a longitudinal overlap 181 between laterally adjacent bonds 155 of the first longitudinally extending series of bonds 151 and the second longitudinally extending series of bonds 153 (for example, as depicted with respect to bonds 155*a'*, 155*b'*) may be equal to 100% of the overall height 163 of the laterally outboard bond, e.g. bond 155*a'*. In further embodiments, the longitudinal overlap 181 may be greater than or equal to 25% and less than or equal to 100% of the overall height 163 of the laterally outboard bond, or may be greater than or equal to 50% and less than or equal to 100% of the overall height 163 of the laterally outboard bond, or greater than or equal to 75% and less than or equal to 100% of the overall height 163 of the laterally outboard bond.

At least some of the bonds 155 of pattern 150*b* may additionally comprise a recess portion 164 disposed in one of the top edge 152 and bottom edge 154 of the bonds 155. According to aspects of the bond pattern 150*b*, the recess portions 164 may have lateral widths 185 in any of the ranges as described with respect to the lateral widths 185 of the bond pattern 150*a*. Although, in more preferred embodiments, the lateral widths 185 of the recess portions 164 of the bond pattern 150*b* may be greater than or equal to 50% and less than or equal to 95% of the overall width 161 of the bonds 155. In even more preferred embodiments, the lateral widths 185 of the recess portions 164 of the bond pattern 150*b* may be greater than or equal to 70% and less than or equal to 95%, or greater than or equal to 80% and less than or equal to 95% of the overall width 161 of the bonds 155 of the overall width 161 of the bonds 155.

The recess portion depth 183 of the bonds 155 of bond pattern 150*b* may be similar or the same to those ranges described with respect to depth 183 of the bonds 155 of bond pattern 150*a*. As will be described in more detail below, such large lateral widths 185 of the recess portions 164 allow for formation of a shaped unbonded region within each of the first longitudinally extending series of bonds 151 and the second longitudinally extending series of bonds 153, allowing for an offset pattern of the bonds 155 between the first longitudinally extending series of bonds 151 and the second longitudinally extending series of bonds 153, as will be described in more detail below.

As with the bonds 155 of bond pattern 150a, the bond pattern 150b may include bonds 155 where recessed portions 164 of two longitudinally adjacent bonds 155 within one of the first longitudinally extending series of bonds 151 and the second longitudinally extending series of bonds 153 face each other. For example, as can be seen in FIG. 3, the recess portion 164 of bond 155d' faces the recess portion 164 of bond 155c', with the recess portion 164 of bond 155c' facing the leg opening 49 and the recess portion 164 of bond 155d' facing the waist opening 50. Again, similar to the pattern 150b, such bonds 155 of the pattern 150b which have recess portions 164 that face each other within the same longitudinally extending series of bonds 151, 153 may have comprise terminal portions 157 which are disposed proximate the same lateral edge 156, 158 of the bonds 155. In the specific case of the first longitudinally extending series of bonds 151 of FIG. 3, the recess portions 164 of the longitudinally adjacent bonds 155c', 155d' terminate at the inboard lateral edge 158 such that the terminal portions 157 coincide with the inboard lateral edge 157. Although, in other embodiments, the recess portions 164 may not terminate at the inboard lateral edge 158, and as such the terminal portions 157 may be disposed proximate the inboard lateral edge 158 but not coincide directly with the inboard lateral edge 158.

One feature of the bond pattern 150b is that the bonds 155 of both the first longitudinally extending series of bonds 151 and the second longitudinally extending series of bonds 153 may not together define a perimeter of a shape or a portion of a shape. Rather, at least some of the bonds 155 of each of the first longitudinally extending series of bonds 151 and the second longitudinally extending series of bonds 153 are disposed such that bonds 155 within each of the first longitudinally extending series of bonds 151 and the second longitudinally extending series of bonds 153 define a perimeter of a shape or, in the specific embodiment of FIG. 3, a portion of a shape.

As one example, bonds 155c' and 155d' each comprise recess portions 164 facing each other with terminal portions 157 disposed proximate the inboard lateral edges 158 of the bonds 155c', 155d'. Similar to the bonds 155 of pattern 150a, the recess portions 164, along with projection lines extending from terminal edges 157 of the bonds 155c', 155d', may define a perimeter around an unbonded region, region 200a in the example of FIG. 3 and bonds 155c', 155d', with the perimeter forming a shape. In the embodiment of unbonded region 200a, the recess portions 164 of the bonds 155c', 155d' form a perimeter of a portion of a shape, or what may be described as an open shape. More specifically, the described perimeter may form a portion of a shape with a rounded end disposed proximate the outboard lateral edge 156. For example, projection lines extending from the terminal portions 157 proximate the inboard lateral edges 158 of the bonds 155c', 155d' would not cross to form a closed shape. Still, the recess portions 164 of the bonds 155c', 155d' in the pattern 150b may form greater than or equal to 60% and less than or equal to 95%, or greater than or equal to 70% and less than or equal to 95%, or greater than or equal to 80% and less than or equal to 95% of a length of the perimeter of the unbonded region 200a enclosed by the recess portions 164 and projection lines extending from the recess portions 164, the perimeter ending at the inboard lateral edges 158 of the bonds 155c', 155d'. As with respect to the bond pattern 150a, the shape of the perimeter of the unbonded region 200a, particularly having a rounded end, provides an increased feeling of softness to a user while providing for a same or greater bond strength as patterns with similar bonded areas but a different bond pattern.

Although not necessary in all embodiments, the lateral widths 183 of the recess portions 164 of the bonds 155c', 155d' may be the same. In further embodiments, such as in the embodiment of FIG. 3, the recess portions 164 of the bonds 155c', 155d' are mirror images of each other, being mirrored about the lateral direction 33. With the relatively large widths 183, the recess portions 164 of the bonds 155c', 155d' of the first longitudinally extending series of bonds 151 may define a large portion of a perimeter of a shape without any bonds 155 of the second longitudinally extending series of bonds 153. As can be seen in the pattern 150b of FIG. 3, recess portion terminal edges 157 of laterally adjacent bonds 155c' and 155e' between the first longitudinally extending series of bonds 151 and the second longitudinally extending series of bonds 153 do not align as they do in the pattern 150a.

However, it may be the case that the second longitudinally extending series of bonds 153 includes bonds 155 which have recess portions 164 which face each other in the longitudinal direction 31. For example, a first bond 155 of the second longitudinally extending series of bonds 153 may have a recess portion 164 in the bottom edge 154 while a second, longitudinally adjacent bond 155 disposed below the first bond 155 may have a recess portion 164 in the top edge 152. Such bonds 155 may further have recess portion terminal edges 157 disposed proximate the outboard lateral edges 156 and whose recess portions 164, along with projection lines extending from the recess portions 164, define a perimeter of a shape or a portion of a shape for an unbonded region 200b. In some embodiments, the unbonded region 200b and the unbonded region 200a may have perimeters which define different shapes or portions of shapes. In the embodiment of pattern 150b, the perimeter defines a shape or portion of a shape of the region 200b having a rounded end disposed proximate the inboard lateral edge 156.

According to some embodiments, recess portions 164 of the some of the bonds 155 of the second longitudinally extending series of bonds 153 may be mirrors of recess portions 164 of bonds 155 of the first longitudinally extending series of bonds 151. For example, in FIG. 3, a recess portion 164 of bond 155e' is a mirror of the recess portion 164 of bond 155d'. In such embodiments, the perimeter defining the unbonded region 200b may define a shape or portion of a shape that is a mirror of the shape defined by the perimeter defining the shape of the unbonded region 200a. Of course, it need not be the case that the recess portions 164 of the bonds 155 of the second longitudinally extending series of bonds 153 are exact mirrors of the recess portions 164 of the bonds 155 of the first longitudinally extending series of bonds 151. Rather, the recess portions 164 of the bonds 155 of the second longitudinally extending series of bonds 153 may define a perimeter having a different shape or portion of a shape for an unbonded region 200b than the recess portions 164 of the bonds 155 of the first longitudinally extending series of bonds 151.

In any of these embodiments, the bonds 155 of the first longitudinally extending series of bonds 151 having recess portions 164 in the top edges 152 may be considered offset from the bonds 155 of the second longitudinally extending series of bonds 153 having recess portions 164 in the top edges 152 by an offset distance 179. In some embodiments, the offset distance 179 may further be thought of as a longitudinal distance between terminal edges 157 of recess portions 164 within either a top edge 152 (as in the example of FIG. 3) or a bottom edge 154 of longitudinally adjacent bonds 155 within the first longitudinally extending series of bonds 151 and the second longitudinally extending series of bonds 153. Having an offset distance 179 allows for a less defined laterally extending unbonded area, which can enhance a strength of the bond pattern 150b relative to the bond pattern 150a. For example, the bond pattern 150a includes straight, rectangular laterally extending unbonded areas between longitudinally adjacent bonds 155 which have non-recessed edges facing each other, which can provide for points of weakness of the bond pattern 150a.

In some embodiments, the offset distance 179 may be greater than or equal to 25% and less than or equal to 80% of the distance 177, which is a longitudinal extent of two longitudinally adjacent bonds 155 which comprise recess portions 164 that face each other and define a perimeter defining a shape or a portion of a shape. In further embodiments, the offset distance 179 may be greater than or equal to 40% and less than or equal to 80% of the distance 177, or greater than or equal to 50% and less than or equal to 80% of the distance 177, or greater than or equal to 55% and less than or equal to 75% of the distance 177.

Similar to the bond pattern 150a, the longitudinally adjacent bonds 155 within one of the first longitudinally extending series of bonds 151 or the second longitudinally extending series of bonds 153 of the bond pattern 150b may alternate in the orientation of which of the top edge 152 and the bottom edge 154 comprises the recess portion 164. For example, depicted bond 155c' comprises a bottom edge 154 which has a recess portion 164. The longitudinally adjacent bond 155d', disposed below the bond 155c' in the longitudinal direction 31, may have a recess portion 164 in the top edge 152 of the bond 155d'. A bond 155 longitudinally adjacent to the bond 155d' and disposed below the bond 155d' in the longitudinal direction 31, e.g. bond 155a', may then have a recess portion 164 in the bottom edge. Accordingly, neither of the bottom edge 154 of the bond 155d' and the top edge 152 of the bond 155a' may have a recess portion 164. Although, it should be understood that this is just one exemplary embodiment and such a feature is not required in all embodiments.

Again, similar to the bond pattern 150a, a grouping of two bonds 155 in either of the first longitudinally extending series of bonds 151 and the second longitudinally extending series of bonds 153 may form a unit which defines a perimeter defining a shape or a portion of a shape. Such groupings may form a repeating pattern within the pattern 150b. It should be understood that the entire bond pattern 150b need not comprised only of such groupings and that such groupings may only represent a portion of the bond pattern 150b. Further, it is not a requirement in all embodiments for the bonds 155 to have only one of the top edge 152 and the bottom edge 154 to have a recess portion 164. In additional embodiments, each top edge 152 and bottom edge 154 of a single bond 155 may have both a non-recessed portion 162 and a recessed portion 164 such that all bonds 155 which are longitudinally adjacent comprise recess portions 164 which face each other in the longitudinal direction 31.

Figure 4:
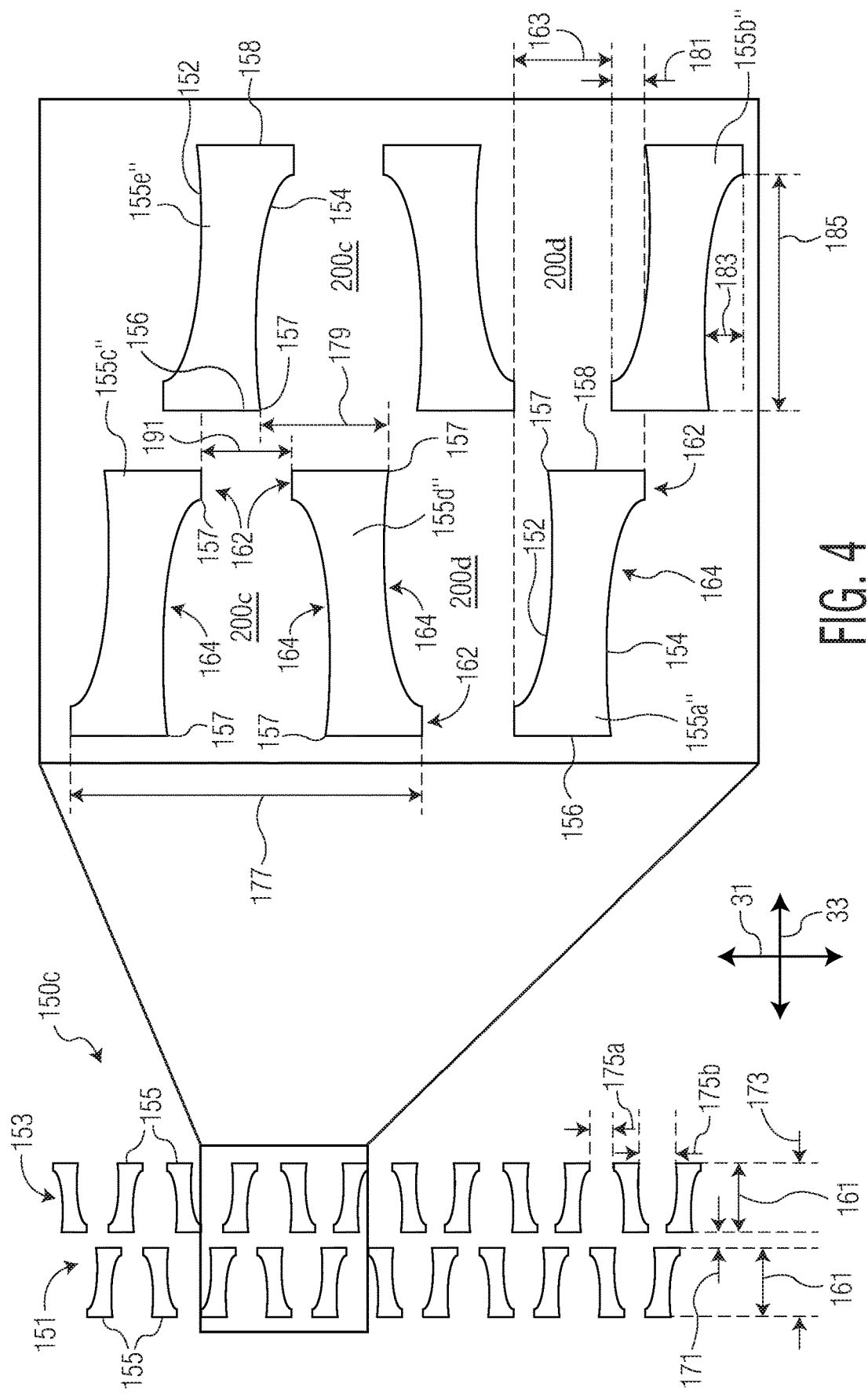
FIG. 4 illustrates a schematic depiction of a further exemplary side seam bond pattern, according to aspects of the present disclosure.

FIG. 4 illustrates another alternative bond pattern 150c. Bond pattern 150c may be similar to bond pattern 150a in many ways. For example, the bonds 155 may be arranged in a first longitudinally extending series of bonds 151 and a second longitudinally extending series of bonds 153. The bonds 155 may have top portions 152, bottom portions 154, outboard lateral edges 156, and inboard lateral edges 158. The general dimensions of the bonds 155 of pattern 150c may be similar to the dimensions described with respect to the bonds 155 of pattern 150a—for example, the overall height 163 and the overall width 161 described with respect to the bonds 155 of pattern 150a are applicable to the height 163 and width 161 of the bonds 155 of pattern 150c. Additionally, the lateral distance 171 and the longitudinal distances 175a, 175b of pattern 150c may be similar to those described with respect to bond pattern 150a.

Additionally, at least portions of the individual bonds 155 of the first longitudinally extending series of bonds 151 overlap in the longitudinal direction 31 with laterally adjacent bonds 155 of the second longitudinally extending series of bonds 153 in the bond pattern 150c as in the bond pattern 150a. For example, as can be seen in FIG. 4, a longitudinal overlap 181 is present between laterally adjacent bonds 155 of the first longitudinally extending series of bonds 151 and the second longitudinally extending series of bonds 153 (for example, as depicted with respect to bonds 155a", 155b"). According to some embodiments of FIG. 4, the longitudinal overlap 181 may be greater than or equal to 5% and less than or equal to 50% of the overall height 163 of the laterally outboard bond, e.g. bond 155a". In further embodiments, the longitudinal overlap 181 may be greater than or equal to 5% and less than or equal to 40% of the overall height 163 of the laterally outboard bond, or may be greater than or equal to 10% and less than or equal to 35% of the overall height 163 of the laterally outboard bond.

At least some of the bonds 155 of pattern 150c may additionally comprise a recess portion 164 disposed in one of the top edge 152 and bottom edge 154 of the bonds 155. According to aspects of the bond pattern 150c, the recess portions 164 may have lateral widths 185 in any of the ranges as described with respect to the lateral widths 185 of the bond pattern 150a. Although, in more preferred embodiments, the lateral widths 185 of the recess portions 164 of the bonds 155 of pattern 150c may be greater than or equal to 50% and less than or equal to 95% of the overall width 161 of the bonds 155. In even more preferred embodiments, the lateral widths 185 of the recess portions 164 of the bonds 155 of pattern 150c may be greater than or equal to 70% and less than or equal to 95%, or greater than or equal to 80% and less than or equal to 95% of the overall width 161 of the bonds 155.

The recess portion depth 183 of the recess portions 164 of the bonds 155 of pattern 150c may be similar or the same to those ranges described with respect to depth 183 of the bonds 155 of bond pattern 150a. As will be described in more detail below, such large lateral widths 185 of the recess portions 164 allow for formation of a shaped unbonded region within each of the first longitudinally extending series of bonds 151 and the second longitudinally extending series of bonds 153, allowing for an offset pattern of the bonds 155 between the first longitudinally extending series of bonds 151 and the first longitudinally extending series of bonds 151, as will be described in more detail below.

One key feature of the bond pattern 150c is that at least some of the bonds 155 of the first longitudinally extending series of bonds 151 and/or the second longitudinally extending series of bonds 153 comprise a recess portion 164 in each of the top edge 152 and the bottom edge 154. Accordingly, in some embodiments according to FIG. 4, for those bonds 155 which include recess portions 164 in both their top edge 152 and their bottom edge 154, each pair of longitudinally adjacent bonds 155 will comprise recess portions 164 which face each other. For example, in FIG. 4, the bond 155d" comprises a recess portion 164 in the top edge 152 which faces a recess portion 164 in the bottom edge 154 of longitudinally adjacent bond 155c". The bond 155d" further comprises a recess portion 164 in the bottom edge 154 which faces a recess portion 164 in the top edge 152 of longitudinally adjacent bond 155a".

For such longitudinally adjacent bonds 155 which comprise recess portions 164 facing each other, the recess portions 164, along with projection lines extending from terminal edges 157 of the recess portions 164, may define a perimeter around an unbonded region with the perimeter forming a shape or a portion of a shape. As one example, bonds 155c", 155d" comprise recess portions 164 which face each other and form a portion of a perimeter defining unbonded region 200c. Bonds 155d", 155a" additionally comprise recess portions 164 which face each other and form a portion of a perimeter defining unbonded region 200d. The perimeters of the unbonded regions 200c, 200d may define a portion of a shape, or what may be described as an open shape. Similar to the pattern 150b, the shapes defined by the perimeters of the regions 200c, 200d of the pattern 150c comprise an open end and a rounded end opposite the open end. As with respect to the bond patterns 150a, 150b, the shape of the perimeter of the unbonded regions 200c, 200d, particularly having a rounded end, provides an increased feeling of softness to a user while providing for a same or greater bond strength as patterns with similar bonded areas but a different bond pattern.

Also similar to the pattern 150b, the recess portions 164 of the bonds 155 of the pattern 150c may form greater than or equal to 60% and less than or equal to 95%, or greater than or equal to 70% and less than or equal to 95%, or greater than or equal to 80% and less than or equal to 95% of a length of the perimeter of the unbonded regions 200c and/or 200d enclosed by the recess portions 164 and projection lines extending from the recess portions 164, with the perimeter ending at the lateral edge 156, 158 where the recess portions 164 terminate (e.g. the outboard lateral edge 156 for the bonds 155c", 155d" and the inboard lateral edge 158 for the bonds 155d", 155a").

According to embodiments of FIG. 4, the recess portion 164 in the top edge 152 and the recess portion 164 in the bottom edge 154 of the same bond 155 may have terminal edges 157 which terminate at a different outboard or inboard lateral edge 156 or 158 of the bond 155. For example, as can be seen with respect to bond 155d", the terminal edge 157 of the recess portion 164 of the top edge 152 terminates at the outboard lateral edge 156 whereas the terminal edge 157 of the recess portion 164 of the bottom edge 154 terminates at the inboard lateral edge 158.

In some of these embodiments where the terminal edges 157 of recess portions 164 of the same bond 155 terminate at a different outboard or inboard lateral edge 156 or 158 of a same bond 155, the resulting perimeters formed at least partially by such recess portions 164 and defining unbonded regions may comprise different shapes. For example, as can be seen within respect to bonds 155c", 155d", and 155a", the perimeters defining the unbonded regions 200c, 200d are differently shaped. According to some embodiments, the recess portion 164 in the top edge 152 and the recess portion 164 in the bottom edge 154 of the same bond 155 may be mirrors of each other— although in this instance mirrored about both the longitudinal direction 31 as well about the lateral direction 33. In these examples, the overall shape of the bonds 155 may be symmetric. For example, for these bonds 155, the top half and the bottom half are the same shape, except rotated 180 degrees. In such embodiments, the perimeters defining the unbonded regions 200c, 200d may be mirrored as well.

Accordingly, in such embodiments where the recess portions 164 of the same bond 155 terminate at a different outboard or inboard lateral edge 156 or 158 of a same bond 155, an alternating pattern may be created whereby a first pair of longitudinally adjacent bonds 155 may define at least part of a first perimeter around a first unbonded region, such as unbonded region 200c, having a first shape. A second pair of longitudinally adjacent bonds 155 may define at least part of a second perimeter around a second unbonded region, such as unbonded region 200d, having a second shape. The second pair of longitudinally adjacent bonds 155 may include a bond that is part of the first pair of longitudinally adjacent bonds 155. Subsequent pairs of longitudinally adjacent bonds 155 in the longitudinal direction 31 may repeat such a pattern whereby perimeters successive unbonded regions form the first shape and the second shape, and so on.

Of course, it is not necessary in all embodiments for the recess portions 164 in the top edge 152 and the recess portion 164 in the bottom edge 154 of the same bond 155 to be mirrors of each other. In other embodiments, the recess portions 164 in the top edge 152 and the recess portion 164 in the bottom edge 154 of the same bond 155 may have the same lateral widths 185 or may have the same depths 183, or may have different same lateral widths 185 and depths 183.

With respect to longitudinally adjacent bonds, as in the pattern 150b, recess portions 164 of longitudinally adjacent bonds 155 of the pattern 150c which face each other may be mirror images of each other, being mirrored about the lateral direction 33. Although, in further embodiments, the recess portions 164 in the top edge 152 and the recess portion 164 in the bottom edge 154 of the longitudinally adjacent bonds 155 may only have the same lateral widths 185 or the same depths 183, or may have different lateral widths 185 and depths 183, and thus not be mirrors of each other.

Where the recess portions 164 of the bonds 155 of the pattern 150c have relatively large widths 183, the recess portions 164 of the bonds 155 of the first longitudinally extending series of bonds 151, such as bonds 155c", 155d", may define a large portion of a perimeter of a shape without any bonds 155 of the second longitudinally extending series of bonds 153. As can be seen in the pattern 150c of FIG. 4, recess portion terminal edges 157 of laterally adjacent bonds 155c" and 155e" between the first longitudinally extending series of bonds 151 and the second longitudinally extending series of bonds 153 do not align as they do in the pattern 150a.

Accordingly, the bond pattern 150c may be similar to the bond pattern 150b in that, in the pattern 150c, the bonds 155 of both the first longitudinally extending series of bonds 151 and the second longitudinally extending series of bonds 153 may not together define a common outline of a shape or a portion of a shape. Rather, at least some of the bonds 155 of each of the first longitudinally extending series of bonds 151 and the second longitudinally extending series of bonds 153 are disposed such that at least some of the bonds 155 within each of the first longitudinally extending series of bonds 151 and the second longitudinally extending series of bonds 153 may separately define an outline of a shape or a portion of a shape.

As in the pattern 150b, the pattern 150c may include, within the second longitudinally extending series of bonds 153, bonds 155 which have recess portions 164 which are mirrors of recess portions 164 of bonds 155 of the first longitudinally extending series of bonds 151. For example, in FIG. 4, a recess portion of bond 155e" is a mirror of the recess portion 164 of in the bottom edge 154 of bond 155d''', mirrored about the longitudinal direction 31. In the embodiment of FIG. 4, these bonds 155 are offset by an offset distance 179. In some embodiments, the offset distance 179 may be greater than or equal to 25% and less than or equal to 80% of the distance 177, which is a longitudinal extent of two longitudinally adjacent bonds 155 which comprise recess portions 164 that face each other and define an outline of a shape or a portion of a shape. In further embodiments, the offset distance 179 may be greater than or equal to 40% and less than or equal to 80% of the distance 177, or greater than or equal to 50% and less than or equal to 80% of the distance 177, or greater than or equal to 55% and less than or equal to 75% of the distance 177.

Of course, it need not be the case that the recess portions 164 of the bonds 155 of the second longitudinally extending series of bonds 153 are mirrors of the recess portions 164 of the bonds 155 of the first longitudinally extending series of bonds 151. Rather, the recess portions 164 of the bonds 155 of the second longitudinally extending series of bonds 153 may define an outline of a different shape or portion of a shape than the recess portions 164 of the bonds 155 of the first longitudinally extending series of bonds 151. Accordingly, the offset distance 179 may also be thought of as a longitudinal distance between terminal edges 157 of recess portions 164 within either a bottom edge 154 (as in the example of FIG. 4) or top edge 152 of longitudinally adjacent bonds 155 within the first longitudinally extending series of bonds 151 and the second longitudinally extending series of bonds 153.

As can be seen, in some embodiments, the second longitudinally extending series of bonds 153 may include bonds 155 which have recess portions 164 which face each other in the longitudinal direction 31. For example, a first bond 155 of the second longitudinally extending series of bonds 153 may have a recess portion 164 in the bottom edge 154 while a second, longitudinally adjacent bond 155 disposed below the first bond 155 may have a recess portion 164 in the top edge 152. Recess portions 164 of such bonds 155, along with projection lines extending from the recess portions 164, may define a perimeter of a shape or a portion of a shape for an unbonded region, such as region 200c or 200d.

According to some embodiments, recess portions 164 of some of the bonds 155 of the second longitudinally extending series of bonds 153 may be mirrors of recess portions 164 of bonds 155 of the first longitudinally extending series of bonds 151. For example, in FIG. 4, a recess portion 164 of bond 155e" is a mirror of the recess portion 164 of bond 155d'''. In such embodiments, the perimeter defining the unbonded region 200d may define a shape or portion of a shape that is a mirror of the shaped defined by the perimeter defining the shape of the unbonded region 200c of the first longitudinally extending series of bonds 151, mirrored about the longitudinal direction 31. Of course, it need not be the case that the recess portions 164 of the bonds 155 of the second longitudinally extending series of bonds 153 are exact mirrors of the recess portions 164 of the bonds 155 of the first longitudinally extending series of bonds 151. Rather, the recess portions 164 of the bonds 155 of the second longitudinally extending series of bonds 153 may define a perimeter having a different shape or portion of a shape for one or more unbonded regions than the recess portions 164 of the bonds 155 of the first longitudinally extending series of bonds 151.

As can be further seen in FIG. 4, in at least some embodiments according to the present disclosure, each of the first longitudinally extending series of bonds 151 and the second longitudinally extending series of bonds 153 may comprise bonds 155 having recess portions 164 which face each other defining perimeters of unbonded regions 200c and 200d which have the same shapes within each of the first longitudinally extending series of bonds 151 and the second longitudinally extending series of bonds 153. For example, as in FIG. 4, the first longitudinally extending series of bonds 151 may comprise bonds 155 having recess portions 164 which face each other and which define perimeters around unbonded regions, such unbonded regions 200c and 200d, which alternate in the longitudinal direction 31. Similarly, the second longitudinally extending series of bonds 153 may comprise bonds 155 having recess portions 164 which face each other and which define perimeters around unbonded regions having the same shapes as the unbonded regions 200c, 200d of the first longitudinally extending series of bonds 151. The unbonded regions 200c and 200d of the second longitudinally extending series of bonds 153 may also alternate in the longitudinal direction 31. In this manner, the look, and more particularly the feel, of the seam 100 comprising the pattern 150c may be similar between the first longitudinally extending series of bonds 151 and the second longitudinally extending series of bonds 153, providing an increased feeling of softness for a wearer or user handling the article 30.

FIG. 5 depicts yet another alternative bond pattern 150d. Bond pattern 150d may be similar to bond pattern 150c in many ways. For example, the bonds 155 may be arranged in a first longitudinally extending series of bonds 151 and a second longitudinally extending series of bonds 153. The bonds 155 may have top portions 152, bottom portions 154, outboard lateral edges 156, and inboard lateral edges 158. The general dimensions of the bonds 155 of pattern 150d may be similar to the dimensions described with respect to the bonds 155 of pattern 150c—for example, the overall height 163 and the overall width 161 described with respect to the bonds 155 of pattern 150c are applicable to the height 163 and width 161 of the bonds 155 of pattern 150d. Additionally, the lateral distance 171 and the longitudinal distances 175a, 175b of pattern 150d may be similar to those described with respect to bond pattern 150c.

At least some of the bonds 155 of pattern 150d may additionally comprise a recess portion 164 disposed in one of the top edge 152 and bottom edge 154 of the bonds 155. According to aspects of the bond pattern 150d, the recess portions 164 may have lateral widths 185 in any of the ranges as described with respect to the lateral widths 185 of the bond pattern 150a. Although, in more preferred embodiments, the lateral widths 185 of the recess portions 164 of the bond pattern 150d may be greater than or equal to 50% and less than or equal to 95% of the overall width 161 of the bonds 155. In even more preferred embodiments, the lateral widths 185 of the recess portions 164 of the bond pattern 150d may be greater than or equal to 70% and less than or equal to 95%, or greater than or equal to 80% and less than or equal to 95% of the overall width 161 of the bonds 155 of the overall width 161 of the bonds 155. The recess portion depth 183 of the bonds 155 of bond pattern 150d may be similar or the same to those ranges described with respect to depth 183 of the bonds 155 of bond pattern 150a. Such large lateral widths 185 of the recess portions 164 allow for formation of a shaped unbonded region within each of the first longitudinally extending series of bonds 151 and the second longitudinally extending series of bonds 153.

One key feature of the bond pattern 150d is that at least some of the bonds 155 of the first longitudinally extending series of bonds 151 and/or the second longitudinally extending series of bonds 153 comprise a recess portion 164 in each of the top edge 152 and the bottom edge 154. In some embodiments, the recess portion 164 in the top edge 152 and the recess portion 164 in the bottom edge 154 of the same bonds 155 may have similar or the same widths 185 and/or similar or the same depths 183. Although, this symmetry is not required in all embodiments. For example, the width 185 and/or the depth 183 of the recess portion 164 in the top edge 152 may be different than the recess portion 164 in the bottom edge 154.

In further embodiments, the recess portion 164 in the top edge 152 and the recess portion 164 in the bottom edge 154 may have terminal edges 157 which terminate at a different outboard or inboard lateral edge 156 or 158 of the bond 155. For example, as can be seen with respect to bond 155d''', the terminal edge 157 of the recess portion 164 of the top edge 152 terminates at the outboard lateral edge 156 whereas the terminal edge 157 of the recess portion 164 of the bottom edge 154 terminates at the inboard lateral edge 158.

In some of these embodiments, the recess portion 164 in the top edge 152 and the recess portion 164 in the bottom edge 154 of the same bond 155 may be mirrors of each other—mirrored about both the longitudinal direction 31 as well about the lateral direction 33. In these examples, the overall shape of the bonds 155 may be symmetric. For example, for these bonds 155, the top half and the bottom half are the same shape, except rotated 180 degrees. Of course, it is not necessary in all embodiments for the recess portions 164 in the top edge 152 and the recess portion 164 in the bottom edge 154 of the same bond 155 to be exact mirrors of each other. In other embodiments, the recess portions 164 in the top edge 152 and the recess portion 164 in the bottom edge 154 of the same bond 155 may have the same one of lateral widths 185 or depths 183 or may have different lateral widths 185 and depths 183.

According to further aspects of the embodiment of FIG. 5, the first longitudinally extending series of bonds 151 and/or the second longitudinally extending series of bonds 153 may further comprise bonds 255 which comprise a recess portion 264 in the top edge 252 and a recess portion 264 in the bottom edge 254 of the bond 255. However, the bonds 255 may differ from such bonds 155 in that the recess portions 264 of the bonds 255 may be disposed such that the terminal edges 157 of the recess portion 264 in the top edge 252 and the recess portion 264 in the bottom edge 254 terminate at the same outboard or inboard lateral edge 256 or 258. In the example of FIG. 5, the bonds 255 of the first longitudinally extending series of bonds 151 are depicted where the terminal edges 157 of recess portion 264 in the top edge 252 and the recess portion 264 in the bottom edge 254 terminate at the outboard lateral edge 256. The bonds 255 of the second longitudinally extending series of bonds 153 are depicted where the terminal edges 157 of recess portion 264 in the top edge 252 and the recess portion 264 in the bottom edge 254 terminate ate the inboard lateral edge 258. However, in further embodiments, such an orientation may be reversed, or bonds 255 within both of the first longitudinally extending series of bonds 151 and the second longitudinally extending series of bonds 153 could have recess portion 264 in the top edge 252 and the recess portion 264 in the bottom edge 254 with terminal edges 157 which all terminate the outboard lateral edge 256 or all terminate at the inboard lateral edge 258 of the bonds 255.

In some embodiments, the recess portion 264 in the top edge 252 and the recess portion 264 in the bottom edge 254 of the bonds 255 may have similar or the same widths 285 and/or similar or the same depths 283. In still further embodiments, the recess portion 264 in the top edge 252 and the recess portion 264 in the bottom edge 254 of the bonds 255 may be mirrors of each other—mirrored about the lateral direction 33. Although, this symmetry is not required in all embodiments. For example, the width 285 and/or the depth 283 of the recess portion 264 in the top edge 252 may be different than the recess portion 264 in the bottom edge 254. Additionally, the recess portion widths 285 and/or the recess portion depths 283 of the bonds 255 may be similar or the same to any of the described ranges of widths 185 and depths 183 with respect to the bonds 155 of pattern 150c.

As depicted in FIG. 5, for at least a portion of the pattern 150d, each pair of longitudinally adjacent bonds 155, 255 in each of the first longitudinally extending series of bonds 151 and the second longitudinally extending series of bonds 153 will comprise recess portions 164, 264 which face each other. In the example of FIG. 5, the bond 155b''' comprises a recess portion 164 in the top edge 152 which faces a recess portion 264 in the bottom edge 254 of longitudinally adjacent bond 255a. The bond 155b''' further comprises a recess portion 164 in the bottom edge 154 which faces a recess portion 264 in the top edge 252 of longitudinally adjacent bond 255b. In at least some of these embodiments, the recess portions 164, 264 of longitudinally adjacent bonds 155, 255 of the pattern 150d and which are within the same longitudinally extending series of bonds 151, 153 may have the same lateral widths 185 and/or may have the same depths 183. In further embodiments, the recess portions 164, 264 of longitudinally adjacent bonds 155, 255 of the same longitudinally extending series of bonds 151, 153 may be mirror images of each other, being mirrored about the lateral direction 33. Although, it should be understood that such symmetry is not required.

In this manner, the recess portions 164, 264 of longitudinally adjacent bonds 155, 255 which face each other—for example as in the recess portions 164 of the bonds 155b''', 255a— along with projection lines extending from terminal edges 157 of the recess portions 164, 264, may form a perimeter defining an unbonded region, such as unbonded region 201b. The perimeter of unbonded regions, such as unbonded region 201b, may define an outline of a shape or a portion of a shape.

For some of longitudinally adjacent bonds 155, 255 within the same longitudinally extending series of bonds 151, 153, the terminal portion 157 of recess portions 164, 264 of the bonds 155, 255 may be disposed proximate, or terminate at, the same lateral edge 156 or 158 (256 or 258). For example, in FIG. 5, bonds 155a''' has a terminal portion 157 of the recess portion 164 in the bottom edge 154 disposed proximate the inboard lateral edge 158 and which terminates at the inboard lateral edge 158. The bond 255a has a terminal portion 157 of the recess portion 264 in the top edge 252, which faces the recess portion 164 in the bottom edge 154 of the bond 155a''', disposed proximate the outboard lateral edge 256 and which terminates at the inboard lateral edge 156. Such a configuration has the recess portions 164, 264 of the bonds 155aw, 255a define a portion of a perimeter around an unbonded region 201a which has a first shape.

The longitudinally adjacent bonds 255a and 155b''' may have recess portions 264, 164 which face each other in the longitudinal direction 31, similar to the bonds 155a''' and 255a. However, for the bonds 255a and 155b''', the recess portion 164 in the top edge 152 of the bond 155b''' has a terminal portion 157 disposed proximate the inboard lateral edge 158 (and terminating at the inboard lateral edge 158) while the recess portion 264 in the bottom edge 254 of the bond 255a has a terminal portion 157 disposed proximate the outboard lateral edge 256 (and terminating at the outboard lateral edge 256). Such a configuration has the recess portions 164, 264 of the bonds 155a''', 255a, along with projection lines extending from the recess portions 164, 264 of the bonds 155a''', 255a, defining a portion of a perimeter around an unbonded region 201b which has a second shape.

In this particular example of FIG. 5, the shapes of the perimeters defining the unbonded regions 201a and 201b are closed shapes, similar to the closed shapes presented with respect to bond pattern 150a. For example, projection lines extending from the terminal edge 157 proximate the outboard lateral edge 156 of the recess portion 164 of the bottom edge 154 of the bond 155aw and from the terminal edge 157 proximate the inboard lateral edge 258 of the recess portion 264 of the bottom edge 254 of the bond 255a would intersect the recess portions 164, 264 of the bonds 155a''', 255a. Additionally in the embodiment of FIG. 5, the shapes of the perimeters defining the unbonded regions 201a, 201b are mirror images of each other, mirrored about the lateral direction 33.

In the pattern 150d, further of the bonds 155, 255 may be arranged so as to define perimeters around unbonded regions with such perimeters at least in part defining further shapes different from those defined for the unbonded regions 201a, 201b. For example, at least some longitudinally adjacent bonds may have recess portions 164, 264 having terminal edges 157 disposed proximate a same lateral edge 156, 158 (256, 258). For example, bond 155b'' comprises a recess portion 164 in the bottom edge 154 which faces a recess portion 264 in the top edge 252 of the longitudinally adjacent bond 255b. For this bond pair, terminal edges 157 of the recess portions 164, 264 are both disposed proximate the outboard lateral edges 156, 256 and terminate at the outboard lateral edges 156, 256. These recess portions 164, 264 at least in part define a perimeter of unbonded region 202a, with the perimeter having a third shape. In the pattern 150d, another bond, bond 155c''', which is also longitudinally adjacent to the bond 255b, may also have a recess portion 164 (disposed in the top edge 152) which faces a recess portion 264 (disposed in the bottom edge 254) of the bond 255b. As with the bonds 155b''', 255b, the terminal portions 157 of the recess portions 164, 264 of the bonds 255b, 155c''' which face each other may be disposed proximate (and terminate at) the same lateral edge—the outboard lateral edge 156, 256. These recess portions 164, 264 at least in part define a perimeter of unbonded region 202a, with the perimeter having the same third shape as the perimeter defining the unbonded region 202a between the bonds 155b''', 255b. In this particular example of FIG. 5, the shape of the perimeters defining the unbonded regions 202a is an open shape with an open end (e.g. proximate the outboard lateral edges 156, 256) and a rounded end opposite the open end. As with respect to the bond patterns 150a, 150b, and 150c, the shape of the perimeter of the unbonded regions 201a, 201b, 202a, 202b, particularly having rounded features or closed shapes, provides an increased feeling of softness to a user while providing for a same or greater bond strength as patterns with similar bonded areas but a different bond pattern.

While the above description has focused on the bonds 155, 255 of the first longitudinally extending series of bonds 151, the second longitudinally extending series of bonds 153 may have similar features. Although, as in the embodiment of FIG. 5, the bonds 155, 255 of the second longitudinally extending series of bonds 153 may be oriented opposite the bonds 155, 255 of the first longitudinally extending series of bonds 151. For example, where the bonds 255 of the first longitudinally extending series of bonds 151 comprise recess portions 264 with terminal portions 157 disposed proximate the outboard lateral edges 256 (and terminating at the outboard lateral edges 256), the bonds 255 of the second longitudinally extending series of bonds 153 may comprise recess portions 264 with terminal portions 157 disposed proximate the inboard lateral edges 258 (and terminating at the inboard lateral edges 258). Similar inverse patterns may be present in the bonds 155 of the second longitudinally extending series of bonds 153. Accordingly, at least some longitudinally adjacent bonds 155, 255 of the second longitudinally extending series of bonds 153 may have recess portions 164, 264 which define at least a portion of a perimeter of an unbonded region 202b. The perimeter defining the unbonded region 202b may have a fourth shape.

According to some embodiments of the present disclosure, recess portions 164 and 264 of some of the bonds 155, 255 of the second longitudinally extending series of bonds 153 may be mirrors of recess portions 164 and 264 of bonds 155, 255 of the first longitudinally extending series of bonds 151. In such embodiments, the fourth shape may be a mirror of the third shape.

Additionally, similar to the pattern 150c, the recess portions 164 of the bonds 155 and the recess portion 264 of the bonds 255 of the pattern 150d may form greater than or equal to 60% and less than or equal to 95%, or greater than or equal to 70% and less than or equal to 95%, or greater than or equal to 80% and less than or equal to 95% of a length of the perimeter of the unbonded regions unbonded regions 201a, 201b, 202a, and/or 202b enclosed by the recess portions 164, 264 and projection lines extending from the recess portions 164, 264, with the perimeter ending at the lateral edge 156, 158 of the open ends of the shapes of unbonded regions 202a, 202b.

The bonds 155, 255 may be formed according to any suitable methods, including but not limited to application of heat energy, ultrasonic energy, and/or pressure. In some embodiments, benefits of the bond patterns 150a-d of the present disclosure have been to be particularly advantageous where the bonds 155, 255 were formed through typical thermal bonding processes.

Bonding of soft materials can be a challenge when using ultrasonic bonding modalities and typical thermal bonding patterns were found to produce relatively hard feeling side seams 100. The patterns 150a-d of the present disclosure were able to produce side seams 100 having equivalent side seam strengths while providing for a softer feeling than other more typical bond patterns.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements. Many modifications and variations of the present disclosure can be made without departing from the spirit and scope thereof. Therefore, the exemplary embodiments described above should not be used to limit the scope of the invention.

EMBODIMENTS

Embodiment 1: An absorbent article may comprise a first material layer bonded to a second material layer by a plurality of bonds, the plurality of bonds comprising a bond pattern extending in a longitudinal direction and a lateral direction and which comprises: a first longitudinally extending series of a plurality of bonds comprising: a first bond having an inboard lateral edge, an outboard lateral edge, a top edge, and a bottom edge, the bottom edge of the first bond having a recess portion; a second bond disposed longitudinally adjacent to the first bond and having an inboard lateral edge, an outboard lateral edge, a top edge, and a bottom edge, the top edge of the second bond having a recess portion, and wherein the top edge of the second bond faces the bottom edge of first bond; wherein each of the recess portion of the first bond and the recess portion of the second bond comprise a terminal portion which are disposed proximate a same outboard lateral edge or inboard lateral edge of the first bond and the second bond.

Embodiment 2: The absorbent article of embodiment 1, wherein the first bond has an overall width and the first bond recess portion has a recess portion width, the second bond has an overall width and the second bond recess portion has a recess portion width, and wherein the recess portion width of the first bond and the recess portion width of the second bond are the same.

Embodiment 3: The absorbent article of any one of embodiment 1 and embodiment 2, wherein the first bond has an overall height and the first bond recess portion has a recess portion depth, the second bond has an overall height and the second bond recess portion has a recess portion depth, and wherein the recess portion depth of the first bond and the recess portion depth of the second bond are the same.

Embodiment 4: The absorbent article of any one of embodiments 1-3, wherein the recess portion of the first bond is a mirror image of the recess portion of the second bond.

Embodiment 5: The absorbent article of any one of embodiments 2-4, wherein the recess portion width of the first bond is greater than or equal to 70% and less than or equal to 95% of the first bond overall width, and wherein the recess portion width of the second bond is greater than or equal to 70% and less than or equal to 95% of the second bond overall width.

Embodiment 6: The absorbent article of any one of embodiments 3-5, wherein the recess portion depth of the first bond is greater than or equal to 10% and less than or equal to 50% of the first bond overall height, and wherein the recess portion depth of the second bond is greater than or equal to 10% and less than or equal to 50% of the second bond overall height.

Embodiment 7: The absorbent article of any one of embodiments 1-6, further comprising a second longitudinally extending series of a plurality of bonds comprising: a third bond having an inboard lateral edge, an outboard lateral edge, a top edge, and a bottom edge, the bottom edge of the first bond having a recess portion; a fourth bond disposed longitudinally adjacent to the third bond and having an inboard lateral edge, an outboard lateral edge, a top edge, and a bottom edge, the top edge of the fourth bond having a recess portion, and wherein the top edge of the fourth bond faces the bottom edge of third bond; wherein each of the recess portion of the third bond and the recess portion of the fourth bond comprise a terminal portion of each of the third bond and the fourth bond are disposed proximate a same outboard lateral edge or inboard lateral edge of the third bond and the fourth bond; and wherein the lateral edge proximate which the terminal portions of the first bond and the second bond of the first longitudinally extending series of plurality of bonds are disposed is the opposite of the lateral edge proximate which the terminal portions of the third bond and the forth bond of the second longitudinally extending series of plurality of bonds are disposed.

Embodiment 8: The absorbent article of embodiment 7, wherein the terminal portions of the first bond and the second bond of the first longitudinally extending series of plurality of bonds are disposed proximate the inboard lateral edges and wherein the terminal portions of the third bond and the fourth bond of the second longitudinally extending series of plurality of bonds are disposed proximate the outboard lateral edges.

Embodiment 9: The absorbent article of any one of embodiments 7-8, wherein the terminal edge of the first bond of the first longitudinally extending series of plurality of bonds and the terminal edge of the third bond of the second longitudinally extending series of plurality of bonds are disposed at a same longitudinal location.

Embodiment 10: The absorbent article of any one of embodiments 7-9, wherein the terminal edge of the second bond of the first longitudinally extending series of plurality of bonds and the terminal edge of the fourth bond of the second longitudinally extending series of plurality of bonds are disposed at a same longitudinal location.

Embodiment 11: The absorbent article of any one of embodiments 7-10, wherein the recess portion of the third bond is a mirror image of the recess portion of the fourth bond.

Embodiment 12: The absorbent article of any one of embodiments 7-11, wherein the recess portion of the third bond is a mirror image of the recess portion of the first bond.

Embodiment 13: The absorbent article of any one of embodiments 7-12, wherein the recess portion of the fourth bond is a mirror image of the recess portion of the second bond.

Embodiment 14: The absorbent article of any one of embodiments 7-13, wherein the recess portions of the first bond, the second bond, the third bond, and the fourth bond define a portion of a perimeter defining a shape of an unbonded region disposed between the first bond, the second bond, the third bond, and the fourth bond.

Embodiment 15: The absorbent article embodiment 14, wherein the shape of the unbonded region is a closed shape.

Embodiment 16: The absorbent article embodiment 15, wherein the shape of the unbonded region is circular, oval shaped, or diamond shaped.

Embodiment 17: The absorbent article of any one of embodiments 14-16, wherein the recess portions of the first bond, the second bond, the third bond, and the fourth bond form greater than or equal to 40% and less than or equal to 95% of a length of the perimeter of the unbonded region enclosed by the recess portions of the first bond, the second bond, the third bond, and the fourth bond.

Embodiment 18: The absorbent article of any one of embodiments 14-17, wherein the recess portions of the first bond, the second bond, the third bond, and the fourth bond form greater than or equal to 60% and less than or equal to 95% of a length of the perimeter of the unbonded region enclosed by the recess portions of the first bond, the second bond, the third bond, and the fourth bond.

Embodiment 19: The absorbent article of any one of embodiments 7-18, wherein: the first bond of the first longitudinally extending series of plurality of bonds and the third bond of the second longitudinally extending series of plurality of bonds are laterally adjacent; wherein the first bond of the first longitudinally extending series of plurality of bonds overlaps the third bond of the second longitudinally extending series of plurality of bonds in the longitudinal direction for a longitudinal overlap distance; and wherein the longitudinal overlap distance is greater than or equal to 75% and less than or equal to 100% of the overall height of the first bond of the first bond of the first longitudinally extending series of plurality of bonds.

Embodiment 20: The absorbent article of any one of embodiments 7-9, wherein the terminal edge of the second bond of the first longitudinally extending series of plurality of bonds and the terminal edge of the fourth bond of the second longitudinally extending series of plurality of bonds are disposed at a different longitudinal location.

Embodiment 21: The absorbent article of embodiment 20, wherein a longitudinal offset distance between the terminal edge of the second bond of the first longitudinally extending series of plurality of bonds and the terminal edge of the fourth bond of the second longitudinally extending series of plurality of bonds is greater than or equal to 25% and less than or equal to 80% of a longitudinal distance between the bottom edge of the second bond and the top edge of the first bond.

Embodiment 22: The absorbent article of embodiment 20, wherein a longitudinal offset distance between the terminal edge of the second bond of the first longitudinally extending series of plurality of bonds and the terminal edge of the fourth bond of the second longitudinally extending series of plurality of bonds is greater than or equal to 50% and less than or equal to 80% of a longitudinal distance between the bottom edge of the second bond and the top edge of the first bond.

Embodiment 23: The absorbent article of any one of embodiments 1-22, wherein the top edge of the first bond has a recess portion and the bottom edge of the second bond has a recess portion.

Embodiment 24: The absorbent article of any one of embodiments 1-23, wherein the inboard lateral edge and the outboard lateral edge of the first bond extend parallel to the longitudinal direction.

Embodiment 25: The absorbent article of any one of embodiments 1-24, wherein the inboard lateral edge and the outboard lateral edge of the first bond extend parallel to the longitudinal direction Embodiment 26: An absorbent article comprising a first material layer bonded to a second material layer by a plurality of bonds, the plurality of bonds comprising a bond pattern extending in a longitudinal direction and a lateral direction and which comprises: a first longitudinally extending series of a plurality of bonds comprising: a first bond having an inboard lateral edge, an outboard lateral edge, a top edge, and a bottom edge, the bottom edge of the first bond having a recess portion and the top edge of the first bond having a recess portion; a second bond disposed longitudinally adjacent to the first bond and having an inboard lateral edge, an outboard lateral edge, a top edge, and a bottom edge, the top edge of the second bond having a recess portion and the bottom edge of the second bond having a recess portion, and wherein the top edge of the second bond faces the bottom edge of first bond; wherein each of the recess portion of the bottom edge of the first bond and the recess portion of the top edge of the second bond comprise a terminal portion which are disposed proximate a same outboard lateral edge or inboard lateral edge of the first bond and the second bond.

Embodiment 27: The absorbent article of embodiment 26, wherein each of the recess portion of the top edge of the first bond and the recess portion of the bottom edge of the second bond comprise a terminal portion, wherein the terminal portion of the recess portion of the top edge of the first bond and the terminal portion of the recess portion of the bottom edge of the first bond are disposed proximate opposite lateral edges of the first bond, and wherein the terminal portion of the recess portion of the top edge of the second bond and the terminal portion of the recess portion of the bottom edge of the second bond are disposed proximate opposite lateral edges of the second bond.

Embodiment 28: The absorbent article of any one of embodiment 26 and embodiment 27, wherein the first bond has an overall width and the recess portion in the top edge of the first bond has a first recess portion width, wherein the recess portion in the bottom edge of the second bond has a second recess portion width, and wherein the first recess portion width and the second recess portion width are the same.

Embodiment 29: The absorbent article of embodiment 28, wherein the first recess portion width is greater than or equal to 70% and less than or equal to 95% of the first bond overall width and the second recess portion width is greater than or equal to 70% and less than or equal to 95% of the second bond overall width.

Embodiment 30: The absorbent article of any one of embodiments 26-29, wherein the first bond has an overall height and the recess portion in the top edge of the first bond has a first recess portion depth, wherein the recess portion in the bottom edge of the second bond has a second recess portion depth, and wherein the first recess portion depth and the second recess portion depth are the same.

Embodiment 31: The absorbent article of any one of embodiments 28-30, wherein the recess portion of the top edge of the first bond and the recess portion of the bottom edge of the second bond are mirror images of each other, being mirrored about both the longitudinal direction and the lateral direction.

Embodiment 32: The absorbent article of any one of embodiments 26-31, wherein the recess portions of the first bond and the second bond define a portion of a perimeter defining a shape of an unbonded region disposed between the first bond and the second bond.

Embodiment 33: The absorbent article embodiment 32, wherein the shape of the unbonded region disposed between the first bond and the second bond is an open shape.

Embodiment 34: The absorbent article embodiment 33, wherein the shape of the unbonded region disposed between the first bond and the second bond has a rounded end.

Embodiment 35: The absorbent article of any one of embodiments 32-34, wherein the recess portions of the first bond and the second bond form greater than or equal to 40% and less than or equal to 95% of a length of the perimeter of the unbonded region enclosed by the recess portions of the first bond and the second bond, the perimeter ending at the inboard lateral edges of the first bond and the second bond.

Embodiment 36: The absorbent article of any one of embodiments 32-34, wherein the recess portions of the first bond and the second bond form greater than or equal to 60% and less than or equal to 95% of a length of the perimeter of the unbonded region enclosed by the recess portions of the first bond and the second bond, the perimeter ending at the inboard lateral edges of the first bond and the second bond.

Embodiment 37: The absorbent article of any one of embodiments 27-36, further comprising a second longitudinally extending series of a plurality of bonds comprising: a third bond having an inboard lateral edge, an outboard lateral edge, a top edge, and a bottom edge, the bottom edge of the third bond having a recess portion and the top edge of the third bond having a recess portion; a fourth bond disposed longitudinally adjacent to the third bond and having an inboard lateral edge, an outboard lateral edge, a top edge, and a bottom edge, the top edge of the fourth bond having a recess portion and the bottom edge of the fourth bond having a recess portion, and wherein the top edge of the fourth bond faces the bottom edge of third bond; wherein each of the recess portion of the bottom edge of third bond and the recess portion of the top edge of the fourth bond comprise a terminal portion, each of the terminal portions of the bottom edge of the third bond and the terminal edge of the top portion of the fourth bond are disposed proximate a same outboard lateral edge or inboard lateral edge of the third bond and the fourth bond; and wherein the lateral edge proximate which the terminal portions of the bottom edge of the first bond and the top edge of the second bond of the first longitudinally extending series of plurality of bonds are disposed is the opposite of the lateral edge proximate which the terminal portions of the third bond and the fourth bond of the second longitudinally extending series of plurality of bonds are disposed.

Embodiment 38: The absorbent article of embodiment 37, wherein the third bond has an overall width and the recess portion in the top edge of the third bond has a third recess portion width, wherein the recess portion in the bottom edge of the fourth bond has a fourth recess portion width, and wherein the third recess portion width and the fourth recess portion width are the same.

Embodiment 39: The absorbent article of embodiment 38, wherein the third recess portion width is greater than or equal to 70% and less than or equal to 95% of the third bond overall width and the fourth recess portion width is greater than or equal to 70% and less than or equal to 95% of the fourth bond overall width.

Embodiment 40: The absorbent article of any one of embodiments 37-39, wherein the third bond has an overall height and the recess portion in the top edge of the third bond has a third recess portion depth, wherein the recess portion in the bottom edge of the fourth bond has a fourth recess portion depth, and wherein the third recess portion depth and the fourth recess portion depth are the same.

Embodiment 41: The absorbent article of any one of embodiments 38-40, wherein the recess portion of the top edge of the third bond and the recess portion of the bottom edge of the fourth bond are mirror images of each other, being mirrored about both the longitudinal direction and the lateral direction.

Embodiment 42: The absorbent article of any one of embodiments 37-41, wherein the recess portion of the top edge of the first bond and the recess portion of the top edge of the third bond are mirror images of each other.

Embodiment 43: The absorbent article of any one of embodiments 37-42, wherein the recess portion of the bottom edge of the second bond and the recess portion of the bottom edge of the fourth bond are mirror images of each other.

Embodiment 44: The absorbent article of any one of embodiments 37-43, wherein: the first bond of the first longitudinally extending series of plurality of bonds and the third bond of the second longitudinally extending series of plurality of bonds are laterally adjacent; wherein the first bond of the first longitudinally extending series of plurality of bonds overlaps the third bond of the second longitudinally extending series of plurality of bonds in the longitudinal direction for a longitudinal overlap distance; and wherein the longitudinal overlap distance is greater than or equal to 5% and less than or equal to 50% of the overall height of the first bond of the first bond of the first longitudinally extending series of plurality of bonds.

Embodiment 45: The absorbent article of any one of embodiments 37-44, wherein: the first bond of the first longitudinally extending series of plurality of bonds and the third bond of the second longitudinally extending series of plurality of bonds are laterally adjacent; wherein the first bond of the first longitudinally extending series of plurality of bonds overlaps the third bond of the second longitudinally extending series of plurality of bonds in the longitudinal direction for a longitudinal overlap distance; and wherein the longitudinal overlap distance is greater than or equal to 10% and less than or equal to 35% of the overall height of the first bond of the first bond of the first longitudinally extending series of plurality of bonds.

Embodiment 46: The absorbent article of any one of embodiments 37-45, wherein the terminal edge of the second bond of the first longitudinally extending series of plurality of bonds and the terminal edge of the fourth bond of the second longitudinally extending series of plurality of bonds are disposed at a different longitudinal location.

Embodiment 47: The absorbent article of embodiment 46, wherein a longitudinal offset distance between the terminal edge of the second bond of the first longitudinally extending series of plurality of bonds and the terminal edge of the fourth bond of the second longitudinally extending series of plurality of bonds is greater than or equal to 25% and less than or equal to 80% of a longitudinal distance between the bottom edge of the second bond and the top edge of the first bond.

Embodiment 48: The absorbent article of embodiment 46, wherein a longitudinal offset distance between the terminal edge of the second bond of the first longitudinally extending series of plurality of bonds and the terminal edge of the fourth bond of the second longitudinally extending series of plurality of bonds is greater than or equal to 50% and less than or equal to 80% of a longitudinal distance between the bottom edge of the second bond and the top edge of the first bond.

Embodiment 49: The absorbent article of any one of embodiments 37-48, wherein the recess portions of the third bond and the fourth bond define a portion of a perimeter defining a shape of an unbonded region disposed between the third bond and the fourth bond.

Embodiment 50: The absorbent article embodiment 49, wherein the shape of the unbonded region disposed between the third bond and the fourth bond is an open shape.

Embodiment 51: The absorbent article embodiment 50, wherein the shape of the unbonded region disposed between the third bond and the fourth bond has a rounded end.

Embodiment 52: The absorbent article of any one of embodiments 49-51, wherein the recess portions of the third bond and the fourth bond form greater than or equal to 40% and less than or equal to 95% of a length of the perimeter of the unbonded region enclosed by the recess portions of the third bond and the fourth bond, the perimeter ending at the inboard lateral edges of the third bond and the fourth bond.

Embodiment 53: The absorbent article of any one of embodiments 49-52, wherein the recess portions of the first third bond and the fourth bond form greater than or equal to 60% and less than or equal to 95% of a length of the perimeter of the unbonded region enclosed by the recess portions of the third bond and the fourth bond, the perimeter ending at the inboard lateral edges of the third bond and the fourth bond.

Embodiment 54: The absorbent article of any one of embodiments 49-53, wherein the shape of the unbonded region disposed between the third bond and the fourth bond is a mirror image of the shape of the unbonded region disposed between the first bond and the second bond.

Embodiment 55: The absorbent article of any one of embodiments 26-54, wherein the first longitudinally extending series of bonds further comprises a fifth bond having an inboard lateral edge, an outboard lateral edge, a top edge, and a bottom edge, the bottom edge of the fifth bond having a recess portion and the top edge of the fifth bond having a recess portion wherein each of the recess portion of the top edge of the fifth bond and the recess portion of the bottom edge of the fifth bond comprise a terminal portion which are disposed proximate a same outboard lateral edge or inboard lateral edge of the fifth bond.

Embodiment 56: The absorbent article of embodiment 55, wherein the terminal portion of the recess portion of the top edge of the fifth bond and the terminal portion of the recess portion of the bottom edge of the fifth bond are disposed proximate the outboard lateral edge of the fifth bond.

Embodiment 57: The absorbent article of any one of embodiment 55 or embodiment 56, wherein the fifth bond has an overall width and the recess portion in the top edge of the fifth bond has a recess portion width and the recess portion in the bottom edge of the fifth bond has a recess portion width, wherein the recess portion in the top edge of the fifth bond and the recess portion in the bottom edge of the fifth bond are the same.

Embodiment 58: The absorbent article of any one of embodiments 55-57, wherein the fifth bond has an overall width and the recess portion in the top edge of the fifth bond has a recess portion width and the recess portion in the bottom edge of the fifth bond has a recess portion width, wherein the recess portion width of the recess portion in the top edge of the fifth bond and the recess portion width of the recess portion in the bottom edge of the fifth bond are the same.

Embodiment 59: The absorbent article of embodiment 58, wherein the recess portion width of the recess portion in the top edge of the fifth bond and the recess portion width of the recess portion in the bottom edge of the fifth bond are greater than or equal to 70% and less than or equal to 95% of the fifth bond overall width Embodiment 60: The absorbent article of any one of embodiments 55-59, wherein the recess portion of the top edge of the fifth bond and the recess portion of the bottom edge of the fifth bond are mirror images of each other.

Embodiment 61: The absorbent article of any one of embodiments 26-60, wherein the second longitudinally extending series of bonds further comprises a sixth bond having an inboard lateral edge, an outboard lateral edge, a top edge, and a bottom edge, the bottom edge of the sixth bond having a recess portion and the top edge of the sixth bond having a recess portion wherein each of the recess portion of the top edge of the sixth bond and the recess portion of the bottom edge of the sixth bond comprise a terminal portion which are disposed proximate a same outboard lateral edge or inboard lateral edge of the sixth bond.

Embodiment 62: The absorbent article of embodiment 61, wherein the terminal portion of the recess portion of the top edge of the sixth bond and the terminal portion of the recess portion of the bottom edge of the sixth bond are disposed proximate the inboard lateral edge of the sixth bond.

Embodiment 63: The absorbent article of any one of embodiment 61 or embodiment 62, wherein the sixth bond has an overall width and the recess portion in the top edge of the sixth bond has a recess portion width and the recess portion in the bottom edge of the sixth bond has a recess portion width, wherein the recess portion in the top edge of the sixth bond and the recess portion in the bottom edge of the sixth bond are the same.

Embodiment 64: The absorbent article of any one of embodiments 61-63, wherein the terminal portion of the recess portion of the top edge of the fifth bond and the terminal portion of the recess portion of the top edge of the sixth bond are mirror images.

Embodiment 65: The absorbent article of any one of embodiments 61-64, wherein the terminal portion of the recess portion of the top edge of the fifth bond and the terminal portion of the recess portion of the bottom edge of the first bond are mirror images.

Embodiment 66: The absorbent article of any one of embodiments 61-65, wherein the terminal portion of the recess portion of the bottom edge of the fifth bond and the terminal portion of the recess portion of the top edge of the second bond are mirror images.

Embodiment 67: The absorbent article of any one of embodiments 61-66, wherein the terminal portion of the recess portion of the bottom edge of the fifth bond and the terminal portion of the recess portion of the bottom edge of the sixth bond are mirror images.

Embodiment 68: The absorbent article of any one of embodiments 26-67, wherein the inboard lateral edge and the outboard lateral edge of the first bond extend parallel to the longitudinal direction.

Embodiment 69: The absorbent article of any one of embodiments 26-68, wherein the inboard lateral edge and the outboard lateral edge of the third bond extend parallel to the longitudinal direction.

Embodiment 70: A method of manufacturing an absorbent article comprising: moving a first web in a first direction; moving an absorbent structure in the first direction and coupling the absorbent structure to the first web; forming a plurality of bonds in the first web, the plurality of bonds forming a bond pattern extending in a longitudinal direction and a lateral direction and comprising: a first longitudinally extending series of a plurality of bonds comprising: a first bond having an inboard lateral edge, an outboard lateral edge, a top edge, and a bottom edge, the bottom edge of the first bond having a recess portion; a second bond disposed longitudinally adjacent to the first bond and having an inboard lateral edge, an outboard lateral edge, a top edge, and a bottom edge, the top edge of the second bond having a recess portion, and wherein the top edge of the second bond faces the bottom edge of first bond; wherein each of the recess portion of the first bond and the recess portion of the second bond comprise a terminal portion which are disposed proximate a same outboard lateral edge or inboard lateral edge of the first bond and the second bond.

Embodiment 71: The method of embodiment 70, further comprising folding the absorbent structure and wherein the bond pattern forms a side seam of the absorbent article.

Embodiment 72: The method of any one of embodiment 70 and embodiment 71, wherein the plurality of bonds are formed through thermal bonding.

What is claimed is:

1. An absorbent article comprising a first material layer bonded to a second material layer by a plurality of bonds, the plurality of bonds comprising a bond pattern extending in a longitudinal direction and a lateral direction and which comprises:
- a first longitudinally extending series of a plurality of bonds comprising:
  - a first bond having an inboard lateral edge, an outboard lateral edge, a top edge, and a bottom edge, the bottom edge of the first bond having a recess portion;
  - a second bond disposed longitudinally adjacent to the first bond and having an inboard lateral edge, an outboard lateral edge, a top edge, and a bottom edge, the top edge of the second bond having a recess portion, and wherein the top edge of the second bond faces the bottom edge of first bond;
  - wherein each of the recess portion of the first bond and the recess portion of the second bond comprise a terminal portion which are disposed proximate a same outboard lateral edge or inboard lateral edge of the first bond and the second bond.

2. The absorbent article of claim 1, wherein the first bond has an overall width and the first bond recess portion has a recess portion width, the second bond has an overall width and the second bond recess portion has a recess portion width, and wherein the recess portion width of the first bond and the recess portion width of the second bond are the same.

3. The absorbent article of claim 1, the first bond has an overall height and the first bond recess portion has a recess portion depth, the second bond has an overall height and the second bond recess portion has a recess portion depth, and wherein the recess portion depth of the first bond and the recess portion depth of the second bond are the same.

4. The absorbent article of claim 1, wherein the recess portion of the first bond is a mirror image of the recess portion of the second bond.

5. The absorbent article of claim 2, wherein the recess portion width of the first bond is greater than or equal to 70% and less than or equal to 95% of the first bond overall width, and wherein the recess portion width of the second bond is greater than or equal to 70% and less than or equal to 95% of the second bond overall width.

6. The absorbent article of claim 3, wherein the recess portion depth of the first bond is greater than or equal to 10% and less than or equal to 50% of the first bond overall height, and wherein the recess portion depth of the second bond is greater than or equal to 10% and less than or equal to 50% of the second bond overall height.

7. The absorbent article of claim 1 further comprising a second longitudinally extending series of a plurality of bonds comprising:
- a third bond having an inboard lateral edge, an outboard lateral edge, a top edge, and a bottom edge, the bottom edge of the third bond having a recess portion;
- a fourth bond disposed longitudinally adjacent to the third bond and having an inboard lateral edge, an outboard lateral edge, a top edge, and a bottom edge, the top edge of the fourth bond having a recess portion, and wherein the top edge of the fourth bond faces the bottom edge of third bond;
- wherein each of the recess portion of the third bond and the recess portion of the fourth bond comprise a terminal portion of each of the third bond and the fourth bond are disposed proximate a same outboard lateral edge or inboard lateral edge of the third bond and the fourth bond; and
- wherein the lateral edge proximate which the terminal portions of the first bond and the second bond of the first longitudinally extending series of plurality of bonds are disposed is the opposite of the lateral edge proximate which the terminal portions of the third bond and the fourth bond of the second longitudinally extending series of plurality of bonds are disposed.

8. The absorbent article of claim 7, wherein the terminal portions of the first bond and the second bond of the first longitudinally extending series of plurality of bonds are disposed proximate the inboard lateral edges and wherein the terminal portions of the third bond and the fourth bond of the second longitudinally extending series of plurality of bonds are disposed proximate the outboard lateral edges.

9. The absorbent article of claim 7, wherein the terminal edge of the first bond of the first longitudinally extending series of plurality of bonds and the terminal edge of the third bond of the second longitudinally extending series of plurality of bonds are disposed at a same longitudinal location.

10. The absorbent article of claim 7, wherein:
- the first bond of the first longitudinally extending series of plurality of bonds and the third bond of the second longitudinally extending series of plurality of bonds are laterally adjacent;
- wherein the first bond of the first longitudinally extending series of plurality of bonds overlaps the third bond of the second longitudinally extending series of plurality of bonds in the longitudinal direction for a longitudinal overlap distance; and
- wherein the longitudinal overlap distance is greater than or equal to 75% and less than or equal to 100% of the overall height of the first bond of the first bond of the first longitudinally extending series of plurality of bonds.

11. The absorbent article of claim 1, wherein the top edge of the first bond has a recess portion and the bottom edge of the second bond has a recess portion.

12. An absorbent article comprising a first material layer bonded to a second material layer by a plurality of bonds, the plurality of bonds comprising a bond pattern extending in a longitudinal direction and a lateral direction and which comprises:
- a first longitudinally extending series of a plurality of bonds comprising:
  - a first bond having an inboard lateral edge, an outboard lateral edge, a top edge, and a bottom edge, the bottom edge of the first bond having a recess portion and the top edge of the first bond having a recess portion;
  - a second bond disposed longitudinally adjacent to the first bond and having an inboard lateral edge, an outboard lateral edge, a top edge, and a bottom edge, the top edge of the second bond having a recess portion and the bottom edge of the second bond having a recess portion, and wherein the top edge of the second bond faces the bottom edge of first bond;
  - wherein each of the recess portion of the bottom edge of the first bond and the recess portion of the top edge of the second bond comprise a terminal portion which are disposed proximate a same outboard lateral edge or inboard lateral edge of the first bond and the second bond.

13. The absorbent article of claim 12, wherein each of the recess portion of the top edge of the first bond and the recess portion of the bottom edge of the second bond comprise a terminal portion, wherein the terminal portion of the recess portion of the top edge of the first bond and the terminal portion of the recess portion of the bottom edge of the first bond are disposed proximate opposite lateral edges of the first bond, and wherein the terminal portion of the recess portion of the top edge of the second bond and the terminal portion of the recess portion of the bottom edge of the second bond are disposed proximate opposite lateral edges of the second bond.

14. The absorbent article of claim 12, wherein the first bond has an overall width and the recess portion in the top edge of the first bond has a first recess portion width, wherein the recess portion in the bottom edge of the first bond has a second recess portion width, and wherein the first recess portion width and the second recess portion width are the same.

15. The absorbent article of claim 14, wherein the first bond has an overall height and the recess portion in the top edge of the first bond has a first recess portion depth, wherein the recess portion in the bottom edge of the first bond has a second recess portion depth, and wherein the first recess portion depth and the second recess portion depth are the same.

16. The absorbent article of claim 14, wherein the recess portion of the top edge of the first bond and the recess portion of the bottom edge of the first bond are mirror images of each other, being mirrored about both the longitudinal direction and the lateral direction.

17. The absorbent article of claim 12, further comprising a second longitudinally extending series of a plurality of bonds comprising:
  a third bond having an inboard lateral edge, an outboard lateral edge, a top edge, and a bottom edge, the bottom edge of the third bond having a recess portion and the top edge of the third bond having a recess portion;
  a fourth bond disposed longitudinally adjacent to the third bond and having an inboard lateral edge, an outboard lateral edge, a top edge, and a bottom edge, the top edge of the fourth bond having a recess portion and the bottom edge of the fourth bond having a recess portion, and wherein the top edge of the fourth bond faces the bottom edge of third bond;
  wherein each of the recess portion of the bottom edge of third bond and the recess portion of the top edge of the fourth bond comprise a terminal portion, each of the terminal portions of the bottom edge of the third bond and the terminal edge of the top portion of the fourth bond are disposed proximate a same outboard lateral edge or inboard lateral edge of the third bond and the fourth bond; and
  wherein the lateral edge proximate which the terminal portions of the bottom edge of the first bond and the top edge of the second bond of the first longitudinally extending series of plurality of bonds are disposed is the opposite of the lateral edge proximate which the terminal portions of the third bond and the fourth bond of the second longitudinally extending series of plurality of bonds are disposed.

18. A method of manufacturing an absorbent article comprising:
  moving a first web in a first direction;
  moving an absorbent structure in the first direction and coupling the absorbent structure to the first web;
  forming a plurality of bonds in the first web, the plurality of bonds forming a bond pattern extending in a longitudinal direction and a lateral direction and comprising:
    a first longitudinally extending series of a plurality of bonds comprising:
      a first bond having an inboard lateral edge, an outboard lateral edge, a top edge, and a bottom edge, the bottom edge of the first bond having a recess portion;
      a second bond disposed longitudinally adjacent to the first bond and having an inboard lateral edge, an outboard lateral edge, a top edge, and a bottom edge, the top edge of the second bond having a recess portion, and wherein the top edge of the second bond faces the bottom edge of first bond;
      wherein each of the recess portion of the first bond and the recess portion of the second bond comprise a terminal portion which are disposed proximate a same outboard lateral edge or inboard lateral edge of the first bond and the second bond.

19. The method of claim 18, further comprising folding the absorbent structure and wherein the bond pattern forms a side seam of the absorbent article.

20. The method of claim 18, wherein the plurality of bonds are formed through thermal bonding.

* * * * *